United States Patent
Nakamura

(10) Patent No.: US 9,529,371 B2
(45) Date of Patent: Dec. 27, 2016

(54) IMAGE PROJECTION SYSTEM AND IMAGE PROJECTION METHOD

(71) Applicant: Roland DG Corporation, Hamamatsu-shi, Shizuoka (JP)

(72) Inventor: Yasutoshi Nakamura, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 419 days.

(21) Appl. No.: 14/325,422

(22) Filed: Jul. 8, 2014

(65) Prior Publication Data

US 2015/0019000 A1 Jan. 15, 2015

(30) Foreign Application Priority Data

Jul. 10, 2013 (JP) ................. 2013-144512

(51) Int. Cl.
| | |
|---|---|
| G06K 9/36 | (2006.01) |
| G05D 25/02 | (2006.01) |
| B29C 67/00 | (2006.01) |
| B33Y 50/02 | (2015.01) |

(52) U.S. Cl.
CPC ........... *G05D 25/02* (2013.01); *B29C 67/0062* (2013.01); *B29C 67/0088* (2013.01); *B33Y 50/02* (2014.12)

(58) Field of Classification Search
USPC ........... 382/276, 275, 174, 154; 1/1; 348/51, 348/208.4, 239; 353/28; 700/120
See application file for complete search history.

(56) References Cited

U.S. PATENT DOCUMENTS

| | | | | |
|---|---|---|---|---|
| 8,610,761 | B2 * | 12/2013 | Haisty ................. | H04N 9/3147 348/51 |
| 8,768,046 | B2 * | 7/2014 | Ernst .................... | G06T 7/0018 382/154 |
| 8,854,483 | B2 * | 10/2014 | Sawada .............. | H04N 5/23248 348/208.4 |
| 9,189,886 | B2 * | 11/2015 | Black ................. | G06K 9/00369 |

FOREIGN PATENT DOCUMENTS

JP 4002983 B2 11/2007

* cited by examiner

*Primary Examiner* — Anh Do
(74) *Attorney, Agent, or Firm* — Keating and Bennett, LLP

(57) ABSTRACT

An image projection system projects a single image on an image projection region from a plurality of image projection sections and includes section that detects checker intersection coordinates in a corrected checkered sheet image, a section that calculates a first projective transformation matrix from the checker intersection coordinates, a section that generates first and second spatial code images, a section that acquires boundary lines in the first and second spatial code images, and acquires first intersection coordinates of the boundary lines, a section that calculates a second projective transformation matrix for projective transformation of the first intersection coordinates, transformed using the first projective transformation matrix, into second intersection coordinates distributed over an entire sub-region of the image projection region, and a section that transforms image data by using the second projective transformation matrix.

6 Claims, 17 Drawing Sheets q : CENTER COORDINATES WITH DESIRED
    SUB-PIXEL PRECISION p : COORDINATES OF EACH POINT
    WITHIN CIRCULAR FIELD OF VIEW R $Dp_i$ : BRIGHTNESS GRADIENT VECTOR FOR $p^i$

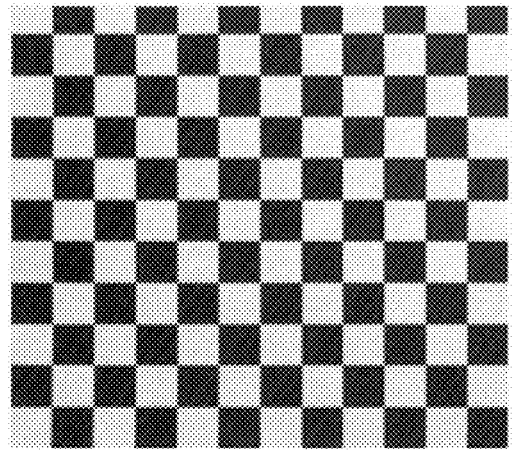
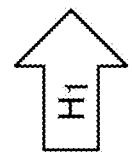
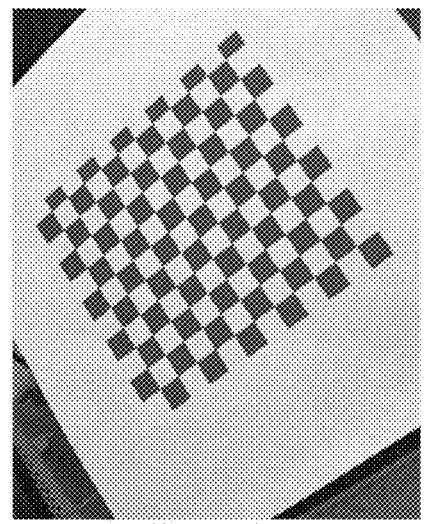
FIG.6

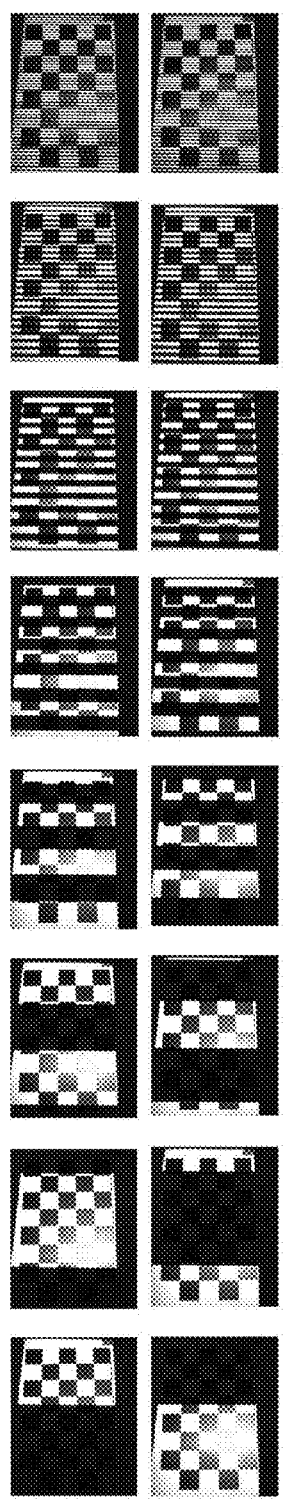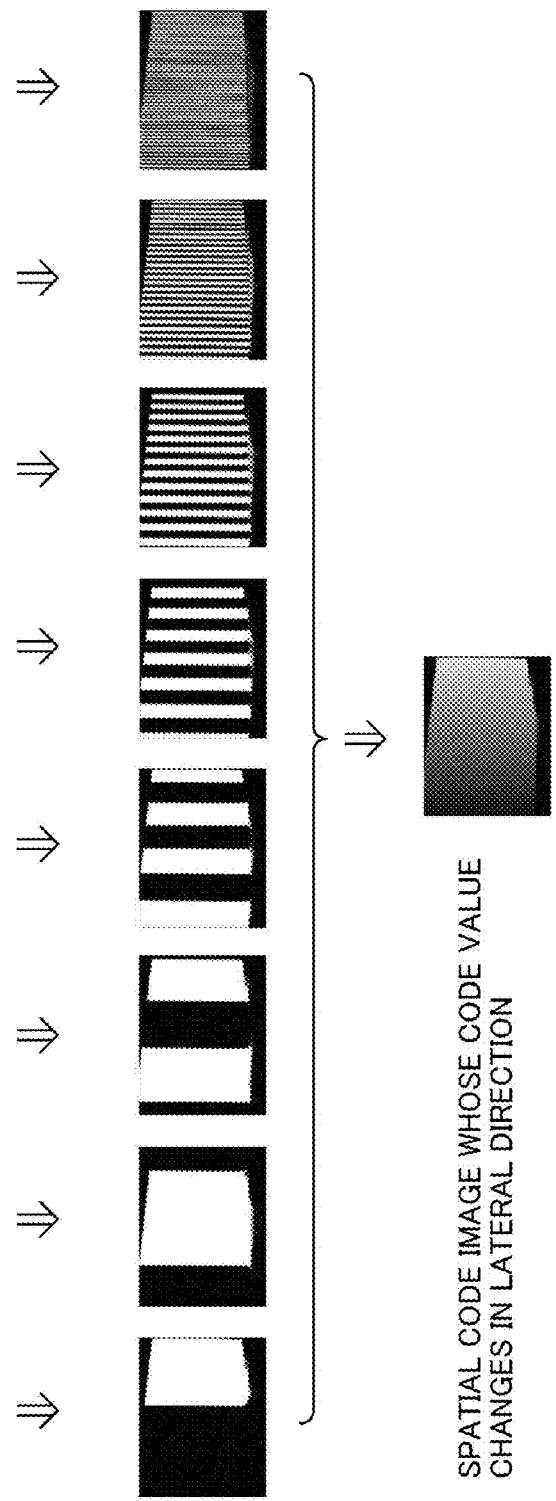
FIG. 7A VERTICAL GRAY CODE PATTERN
POSITIVE IMAGES
NEGATIVE IMAGES
FIG. 7B BINARY IMAGES
FIG. 7C SPATIAL CODE IMAGE WHOSE CODE VALUE CHANGES IN LATERAL DIRECTION

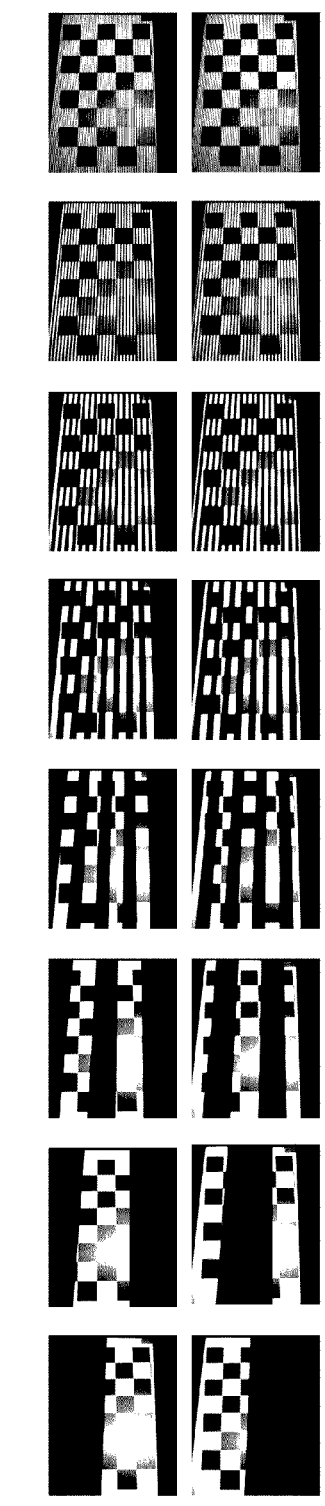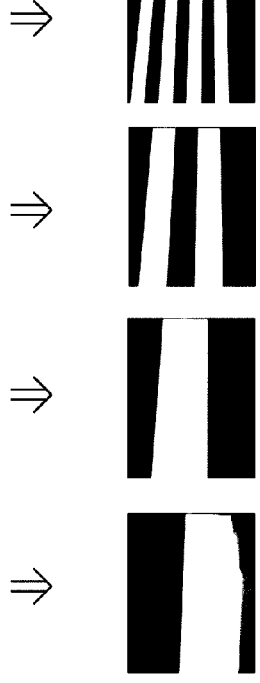
FIG. 8A HORIZONTAL GRAY CODE PATTERN POSITIVE IMAGES NEGATIVE IMAGES
FIG. 8B BINARY IMAGES
FIG. 8C SPATIAL CODE IMAGE WHOSE CODE VALUE CHANGES IN LONGITUDINAL DIRECTION (1366+5)/6=228
LATERAL CODE VALUES RANGE FROM 0 TO 227
LATERALLY ARRANGED BOUNDARY LINES $U_n$ RANGE FROM $U_0$ TO $U_{226}$ (768+2)/3=256
LONGITUDINAL CODE VALUES RANGE FROM 0 TO 255
LONGITUDINALLY ARRANGED BOUNDARY LINES $V_n$ RANGE FROM $V_0$ TO $V_{254}$

IMAGE PROJECTION SYSTEM AND IMAGE PROJECTION METHOD

This application claims priority to Patent Application No. 2013-144512 filed in Japan on Jul. 10, 2013, the entire contents of which are hereby incorporated by reference.

BACKGROUND OF THE INVENTION

1. Field of the Invention

The present invention relates to image projection systems and image projection methods. More specifically, the present invention relates to an image projection system and an image projection method for projecting images on an image projection region from a plurality of image projection sections.

2. Description of the Related Art

A stereolithography apparatus that produces a three-dimensional shaped object by using a photo-curable resin in liquid form is conventionally known. A photo-curable resin has the property of being cured with irradiation of light such as visible light or ultraviolet light.

As such a stereolithography apparatus, a "lifting type" stereolithography apparatus, for example, is used. In the lifting type stereolithography apparatus, three-dimensional shaping is performed by sequentially stacking photo-curable resins each cured into a given shape.

In the lifting type stereolithography apparatus, a transparent plate is used as a bottom wall of a container that stores a photo-curable resin in liquid form. A shaped object holing plate serving as a base for a three-dimensional shaped object is disposed inside the container. With irradiation of light from below the transparent plate, the photo-curable resin is cured to have a given liquid layer thickness at a lower surface of the shaped object holding plate. Thus, a cured layer having a given liquid layer thickness is provided at the lower surface of the shaped object holding plate.

Then, the cured layer cured between the shaped object holding plate and the transparent plate is peeled off from the transparent plate serving as the bottom wall of the container, and the shaped object holding plate is raised by a given liquid layer thickness.

Subsequently, with irradiation of light from below the transparent plate, the photo-curable resin is cured by a given liquid layer thickness to provide another cured layer in addition to the cured layer provided at the lower surface of the shaped object holding plate.

These operations are repeated in sequence, thus providing a three-dimensional shaped object.

With the use of the lifting type stereolithography apparatus, cured layers each having a desired shape are sequentially stacked by repeating the above-described operations in sequence. As a result, a three-dimensional shaped object having a desired shape can be produced.

In such a stereolithography apparatus, a given image has to be projected on an interface between a bottom wall of a container and a photo-curable resin layer from a projector which is an image projection section, in order to allow a photo-curable resin stored in the container to be cured into a desired shape.

Such a stereolithography apparatus may use an image projection system in which an image representing a three-dimensional shaped object is formed from images projected on an image projection region from a plurality of projectors. Note that the term "image projection region" refers to a region of an image projection surface where an image is projected. In the above-described stereolithography apparatus, the image projection surface is the interface between the bottom wall of the container and the photo-curable resin layer.

In such an image projection system, a plurality of projectors are used in accordance with a size of an image projection region. In this case, the image projection region is divided in accordance with a size of an input image of each projector. Images are projected on the divided regions from different projectors.

An image projected from each projector is an image obtained by dividing, in accordance with each of the divided regions, a single image projected on the entire image projection region. Hereinafter, a single "image projected on the entire image projection region" will be referred to as a "large image", and an "image obtained by dividing the large image in accordance with each of the divided regions" will simply be referred to as a "divided image".

The following description will be provided for an example illustrated in FIGS. 16A and 16B. In this example, a large image "A" is projected on an image projection region R having dimensions of 136.1 mm (7716 pixels) by 121 mm (6862 pixels) with the use of two projectors each capable of projecting an image of 1366 by 768 pixels.

First, as illustrated in FIG. 16A, the image projection region R is divided into a first sub-region $S_1$ and a second sub-region $S_2$. The first sub-region $S_1$ is an upper sub-region with respect to a center of the image projection region R in a longitudinal direction Y, and the second sub-region $S_2$ is a lower sub-region with respect to the center of the image projection region R in the longitudinal direction Y. The first sub-region $S_1$ is set as a region where an image is to be projected from a first projector. The second sub-region $S_2$ is set as a region where an image is to be projected from a second projector.

Subsequently, as illustrated in FIG. 16B, the large image A is divided into a divided image P1 to be located in the first sub-region $S_1$ and a divided image P2 to be located in the second sub-region $S_2$. The divided image P1 is set as an image to be projected from the first projector. The divided image P2 is set as an image to be projected from the second projector.

Then, the divided image P1 is projected on the first sub-region $S_1$ from the first projector, while the divided image P2 is projected on the second sub-region $S_2$ from the second projector. As a result, the large image A is projected on the image projection region R.

In such an image projection system, installation positions and/or orientations of the projectors must be adjusted so that each divided image is projected in a proper state on a target sub-region of an image projection region.

As used herein, the term "proper state" refers to a state in which the divided image is projected on the target sub-region without any distortion in shape from the projector (image projection section).

As a technique for adjusting projector position and/or orientation, a technique disclosed in Japanese Patent No. 4002983, for example, is known.

Japanese Patent No. 4002983 discloses a technique for providing a mechanism for adjusting projector position and/or orientation. In the technique disclosed in Japanese Patent No. 4002983, an image projected from a projector is projected in a proper state on an image projection region of an image projection surface.

However, when an image projection system installed on a stereolithography apparatus is provided with a mechanism for adjusting projector position and/or orientation, the image projection system is increased in size. As a result, the stereolithography apparatus on which the image projection system is installed is undesirably increased in overall size.

Moreover, when an image projection system is provided with a mechanism for adjusting projector position and/or orientation, fabrication cost for the image projection system is increased. As a result, fabrication cost for a stereolithography apparatus on which the image projection system is installed is undesirably increased.

If an image projected from a projector is corrected so that the image is in a proper state in a target sub-region of an image projection region without providing a mechanism for adjusting projector position and/or orientation, a large image is projected in a proper state on the image projection region without causing the above-mentioned problems.

SUMMARY OF THE INVENTION

Accordingly, preferred embodiments of the present invention provide an image projection system and an image projection method which correct an image projected from each of a plurality of projectors so that the image is projected in a proper state on a target sub-region of an image projection region.

An image projection system according to a preferred embodiment of the present invention is an image projection system for projecting a single image on an image projection region by projecting images on different sub-regions within the image projection region from a plurality of image projection sections, the system including an image-taking section configured to take, via a lens, an image of a checkered sheet placed in the image projection region; a correction section configured to correct lens-induced distortion of the taken checkered sheet image by using an internal parameter of the image-taking section; a checker intersection coordinate detection section configured to detect, with sub-pixel precision, checker intersection coordinates in the corrected checkered sheet image; a first transformation matrix calculation section configured to calculate a first projective transformation matrix for projective transformation of the detected checker intersection coordinates into checker intersection coordinates located at equal or substantially equal intervals in the image projection region; a generation section configured to correct, when first positive images and first negative images of an 8-bit vertical Gray code pattern projected on a first sub-region of the image projection region from a given one of the image projection sections are taken by the image-taking section, lens-induced distortion of the taken first positive images and first negative images by using the internal parameter of the image-taking section, and generate a first spatial code image whose code value changes in a lateral direction based on the corrected first positive images and first negative images, and to correct, when second positive images and second negative images of an 8-bit horizontal Gray code pattern projected on the first sub-region from the given image projection section are taken by the image-taking section, lens-induced distortion of the taken second positive images and second negative images by using the internal parameter of the image-taking section, and generate a second spatial code image whose code value changes in a longitudinal direction based on the corrected second positive images and second negative images; a boundary coordinate acquisition section configured to obtain, with sub-pixel precision, an intersection of brightness profiles in the corrected first positive images and first negative images, and to obtain, with sub-pixel precision, an intersection of brightness profiles in the corrected second positive images and second negative images, thus acquiring the obtained intersections as boundary coordinates; an intersection acquisition section configured to acquire, based on the acquired boundary coordinates, a first boundary line connecting the boundary coordinates of the same code value in the first spatial code image, acquire, based on the acquired boundary coordinates, a second boundary line connecting the boundary coordinates of the same code value in the second spatial code image, and combine the first and second spatial code images, thus acquiring first intersection coordinates of the first and second boundary lines; a second transformation matrix calculation section configured to transform the acquired first intersection coordinates by using the first projective transformation matrix, and calculate a second projective transformation matrix for projective transformation of the transformed first intersection coordinates into second intersection coordinates distributed over the entire first sub-region; and an image data correction section configured to transform, using the second projective transformation matrix, image data to be outputted to the given image projection section, thus correcting the image data, wherein the second transformation matrix calculation section is configured to transform the first intersection coordinates transformed by using the first projective transformation matrix and the second intersection coordinates to be distributed over the entire first sub-region into coordinates of a local coordinate system specific to the given image projection section, and then calculate the second projective transformation matrix.

According to another preferred embodiment of the present invention, the second intersection coordinates distributed over the entire first sub-region preferably are intersection coordinates of the first and second boundary lines obtained when the first boundary line in the first spatial code image and the second boundary line in the second spatial code image are placed in a grid pattern in the first sub-region.

According to still another preferred embodiment of the present invention, when the first and second boundary lines are placed in a grid pattern in the first sub-region and a size of an input image of the given image projection section is "X" by "Y" pixels, a value of "j" obtained when a value of $\{Y+(j-1)\}/j$ (where "j" is a positive integer) is closest to a number of the first boundary lines is preferably defined as an interval between the first boundary lines, and a value of "k" obtained when a value of $\{X+(k-1)\}/k$ (where "k" is a positive integer) is closest to a number of the second boundary lines is preferably defined as an interval between the second boundary lines.

An image projection method according to another preferred embodiment of the present invention is an image projection method for projecting a single image on an image projection region by projecting images on different sub-regions within the image projection region from a plurality of image projection sections, the method including preparing an image-taking section that takes an image via a lens, and a plurality of image projection sections that project images on the different sub-regions within the image projection region; taking an image of a checkered sheet placed in the image projection region by the image-taking section; correcting lens-induced distortion of the taken checkered sheet image by using an internal parameter of the image-taking section; detecting, with sub-pixel precision, checker intersection coordinates in the corrected checkered sheet image; calculating a first projective transformation matrix for projective transformation of the detected checker intersection coordinates into checker intersection coordinates located at equal or substantially equal intervals in the image projection region; correcting, when first positive images and first negative images of an 8-bit vertical Gray code pattern projected on a first sub-region of the image projection region from a given one of the image projection sections are taken by the image-taking section, lens-induced distortion of the taken first positive images and first negative images by using the internal parameter of the image-taking section, and generating a first spatial code image whose code value changes in a lateral direction based on the corrected first positive images and first negative images; correcting, when second positive images and second negative images of an 8-bit horizontal Gray code pattern projected on the first sub-region from the given image projection section are taken by the image-taking section, lens-induced distortion of the taken second positive images and second negative images by using the internal parameter of the image-taking section, and generating a second spatial code image whose code value changes in a longitudinal direction based on the corrected second positive images and second negative images; obtaining, with sub-pixel precision, an intersection of brightness profiles in the corrected first positive images and first negative images, and obtaining, with sub-pixel precision, an intersection of brightness profiles in the corrected second positive images and second negative images, thus acquiring the obtained intersections as boundary coordinates; acquiring, based on the acquired boundary coordinates, a first boundary line connecting the boundary coordinates of the same code value in the first spatial code image, acquiring, based on the acquired boundary coordinates, a second boundary line connecting the boundary coordinates of the same code value in the second spatial code image, and combining the first and second spatial code images, thus acquiring first intersection coordinates of the first and second boundary lines; transforming the acquired first intersection coordinates by using the first projective transformation matrix, and calculating a second projective transformation matrix for projective transformation of the transformed first intersection coordinates into second intersection coordinates distributed over the entire first sub-region; and transforming, using the second projective transformation matrix, image data to be outputted to the given image projection section, thus correcting the image data, wherein the first intersection coordinates transformed by using the first projective transformation matrix and the second intersection coordinates to be distributed over the entire first sub-region are transformed into coordinates of a local coordinate system specific to the given image projection section, and then the second projective transformation matrix is calculated.

According to another preferred embodiment of the present invention, the second intersection coordinates distributed over the entire first sub-region preferably are intersection coordinates of the first and second boundary lines obtained when the first boundary line in the first spatial code image and the second boundary line in the second spatial code image are placed in a grid pattern in the first sub-region.

According to still another preferred embodiment of the present invention, when the first and second boundary lines are placed in a grid pattern in the first sub-region and a size of an input image of the given image projection section is "X" by "Y" pixels, a value of "j" obtained when a value of {Y+(j−1)}/j (where "j" is a positive integer) is closest to a number of the first boundary lines is defined as an interval between the first boundary lines, and a value of "k" obtained when a value of {X+(k−1)}/k (where "k" is a positive integer) is closest to a number of the second boundary lines is defined as an interval between the second boundary lines.

Various preferred embodiments of the present invention provide an image projection system and an image projection method which correct an image projected from each of a plurality of projectors so that the image is projected in a proper state on a target sub-region of an image projection region.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is an explanatory representation illustrating transformation of checker intersection coordinates of a checkered sheet from a camera image coordinate system into a shaping region coordinate system.

FIG. 7A is an explanatory representation illustrating positive images and negative images of an 8-bit vertical Gray code pattern.

FIG. 7B is an explanatory representation illustrating binary images obtained from the positive images and negative images of FIG. 7A.

FIG. 7C is a spatial code image which is generated from the eight binary images illustrated in FIG. 7B and whose code value changes in a lateral direction.

FIG. 8A is an explanatory representation illustrating positive images and negative images of an 8-bit horizontal Gray code pattern.

FIG. 8B is an explanatory representation illustrating binary images obtained from the positive images and negative images of FIG. 8A.

FIG. 8C is a spatial code image which is generated from the eight binary images illustrated in FIG. 8B and whose code value changes in a longitudinal direction.

DETAILED DESCRIPTION OF THE PREFERRED EMBODIMENTS

Hereinafter, preferred embodiments of an image projection system and an image projection method according to the present invention will be described with reference to the accompanying drawings.

Figure 1:
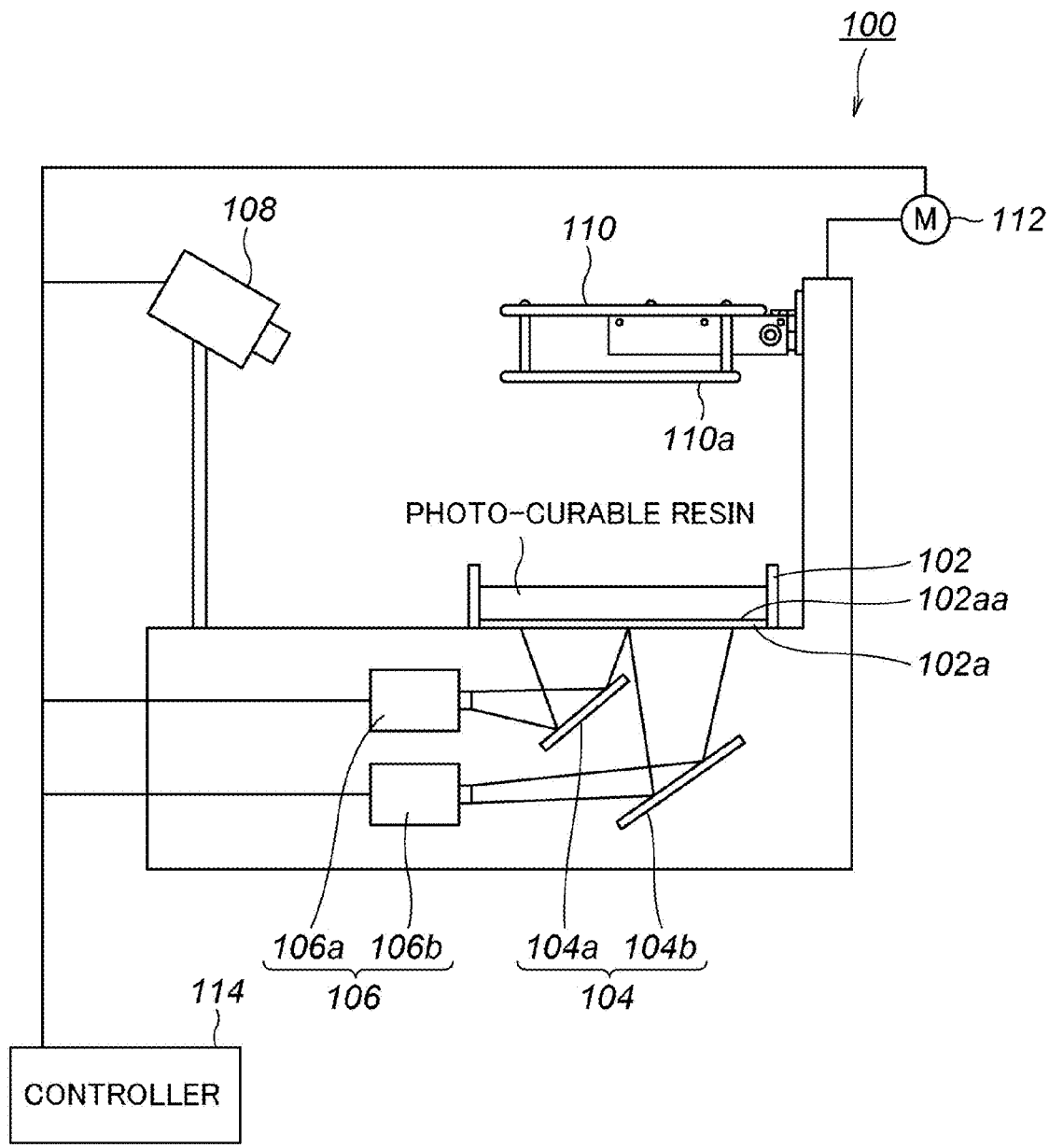
FIG. 1 is an explanatory diagram schematically illustrating a stereolithography apparatus including an image projection system according to a preferred embodiment of the present invention.
Figure 2:
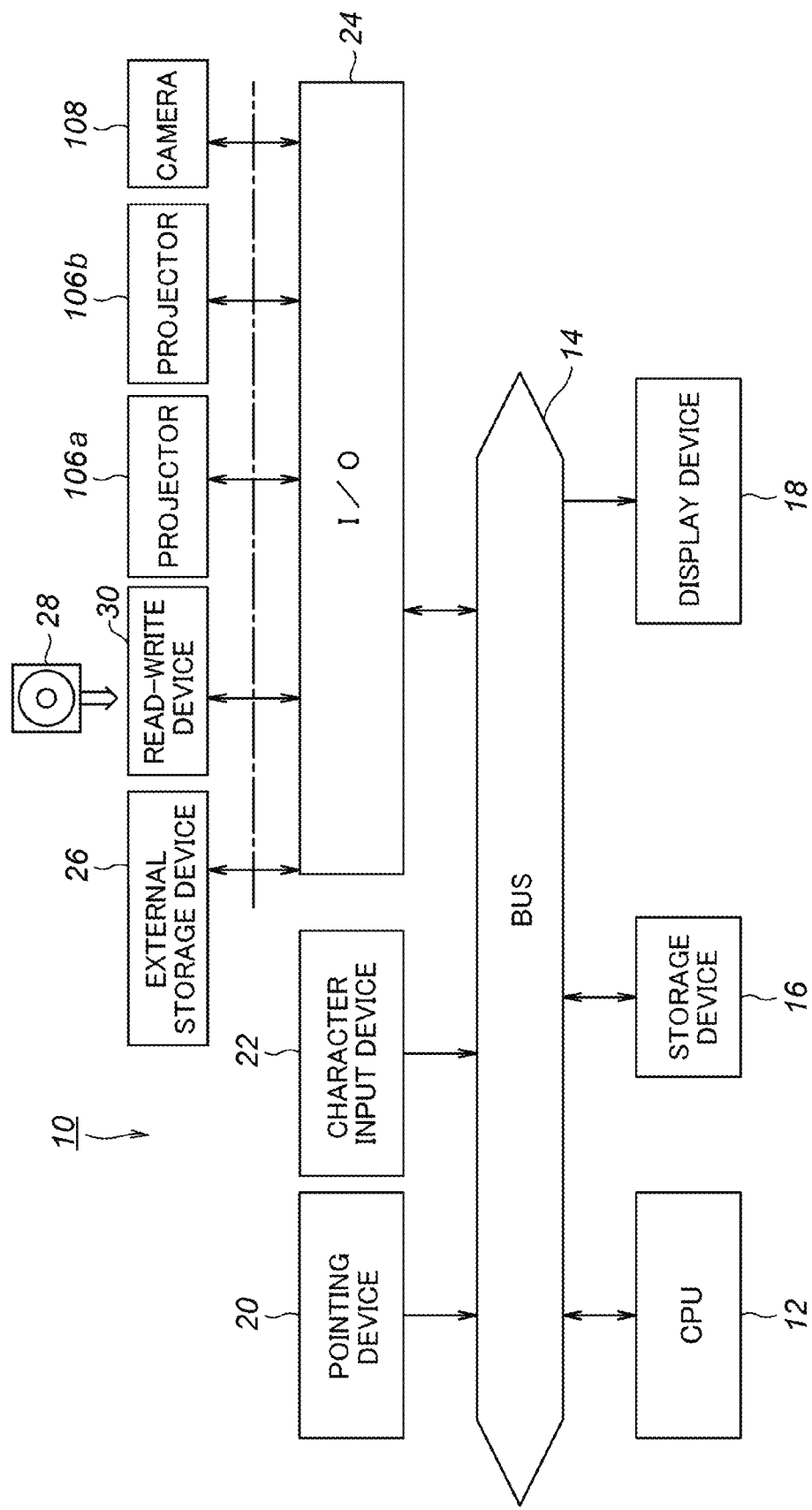
FIG. 2 is a block diagram illustrating a hardware configuration of the image projection system according to a preferred embodiment of the present invention.

FIG. 1 is an explanatory diagram schematically illustrating a stereolithography apparatus 100 including an image projection system 10 according to a preferred embodiment of the present invention. FIG. 2 is an explanatory block diagram illustrating a hardware configuration of the image projection system 10 according to the present preferred embodiment.

As illustrated in FIG. 1, the stereolithography apparatus 100 preferably includes a container 102, a mirror 104, a projector 106, a camera 108, a shaped object holding section 110, a driving section 112, and a controller 114.

The container 102 stores a photo-curable resin in liquid form which is cured with irradiation of light such as visible light or ultraviolet light. A bottom wall 102a of the container 102 is provided by a transparent plate. The container 102 is arranged so that an image projected from the projector 106 is projected on an image projection surface which is an interface between the photo-curable resin and the bottom wall 102a.

Via the mirror 104, the projector 106 projects, on the bottom wall 102a of the container 102, an image outputted from the controller 114. More specifically, via the mirror 104, the projector 106 projects, on an image projection region of the image projection surface, the image outputted from the controller 114. The image outputted from the controller 114 is projected toward the bottom wall 102a of the container 102 from below the container 102.

The image projected from the projector 106 includes a plurality of images in which a shape of a three-dimensional shaped object to be produced is horizontally divided and separated into a plurality of layers.

The projector 106 is controlled by the controller 114 so that the plurality of images are projected in sequence for each layer at regular time intervals.

Figure 16A:
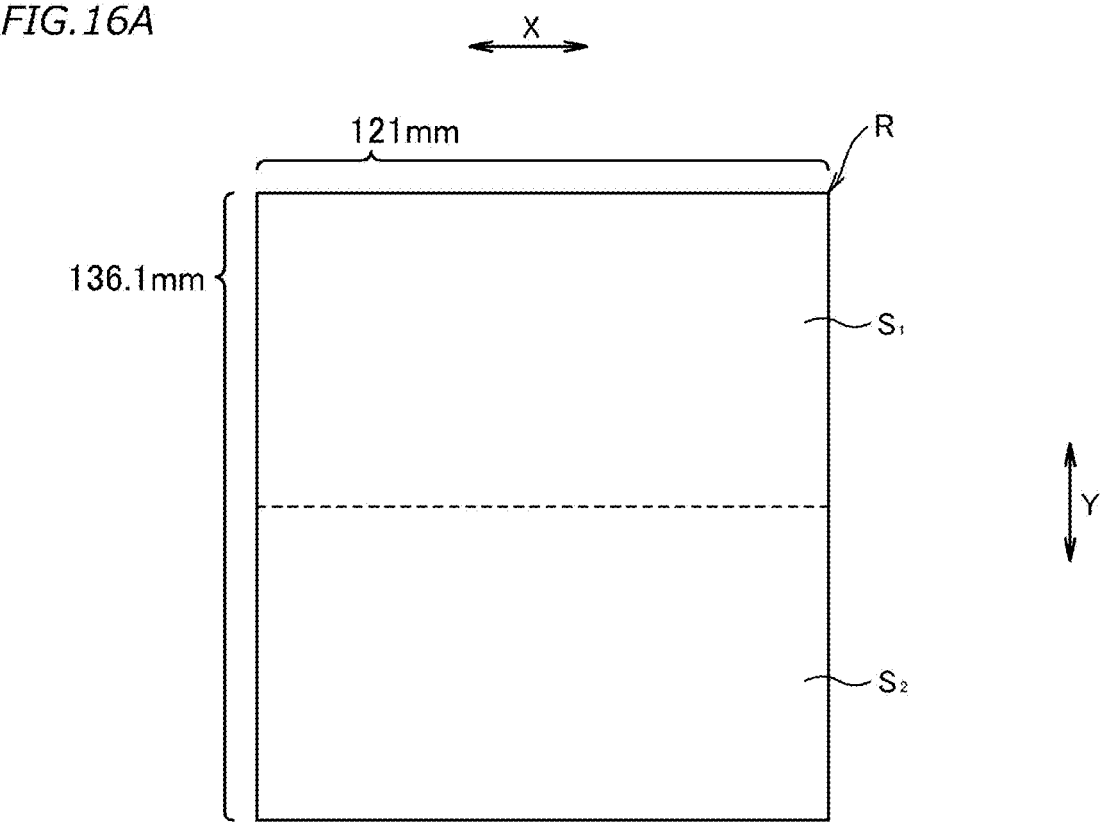
FIG. 16A is an explanatory diagram illustrating an example in which an image projection region is divided into a plurality of sub-regions.

The projector 106 according to the present preferred embodiment preferably includes a projector 106a and a projector 106b. The mirror 104 according to the present preferred embodiment preferably includes a mirror 104a and a mirror 104b. The projector 106a is disposed at a position and orientation at which the projector 106a is capable of projecting an image on a given sub-region $S_1$ (see FIG. 16A) within an image projection region R via the mirror 104a. The "given sub-region $S_1$" will hereinafter be referred to as a "first sub-region $S_1$". The projector 106b is disposed at a position and orientation at which the projector 106b is capable of projecting an image on a sub-region $S_2$ (see FIG. 16A) other than the first sub-region $S_1$ within the image projection region R via the mirror 104b. The "sub-region $S_2$ other than the first sub-region $S_1$" will hereinafter be referred to as a "second sub-region $S_2$".

Figure 16B:
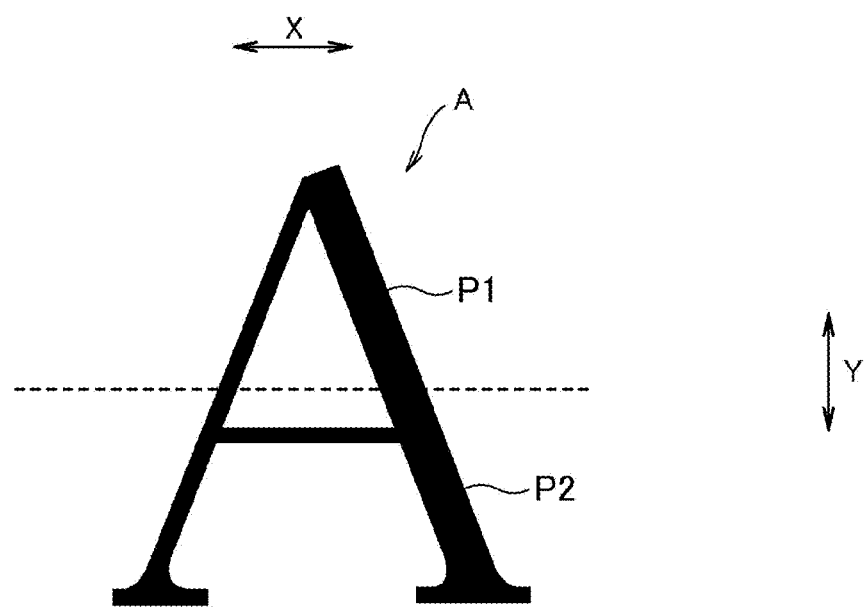
FIG. 16B is an explanatory diagram illustrating an example in which an image to be projected on the image projection region is divided into a plurality of images.

Images are projected on the first and second sub-regions $S_1$ and $S_2$ of the image projection region R (see FIG. 16A) from the projectors 106a and 106b, respectively, thus projecting a given image A (see FIG. 16B) on the image projection region R. The given image A is one of a plurality of images in which a shape of a three-dimensional shaped object to be produced is horizontally divided and separated into a plurality of layers. The projectors 106a and 106b are arranged to project first and second divided images P1 and P2 (see FIG. 16B) of the given image A, respectively. The first divided image P1 is projected on the first sub-region $S_1$ of the image projection region R from the projector 106a via the mirror 104a. The second divided image P2 is projected on the second sub-region $S_2$ of the image projection region R from the projector 106b via the mirror 104b. The first divided image P1 projected from the projector 106a and the second divided image P2 projected from the projector 106b allow a single image (i.e., a single large image) to be projected on the entire image projection region R. In the stereolithography apparatus 100, a plurality of the large images A in which a shape of a three-dimensional shaped object to be produced is horizontally divided and separated into a plurality of layers are projected on the image projection region R in sequence for each layer at regular time intervals.

Note that the image projection region R has a size that allows the image projection region R to be divided into sub-regions each having an aspect ratio equal to an aspect ratio of the associated one of the projectors 106a and 106b.

As illustrated in FIG. 1, the camera 108 is disposed at a position at which the camera 108 can capture the image projected on the bottom wall 102a of the container 102 from the projector 106. The camera 108 preferably includes a lens. The camera 108 takes an image of the container 102 from above the container 102. The camera 108 is disposed at a position and orientation at which the camera 108 can take an image of the entire image projection region that is a region of the container 102 where the image is projected. As used herein, the term "image projection region" refers to a region where a three-dimensional shaped object is actually shaped by the stereolithography apparatus 100.

The shaped object holding section 110 holds the photo-curable resin cured inside the container 102. The shaped object holding section 110 serves as a base that holds a three-dimensional shaped object. A lower surface 110a of the shaped object holding section 110 is brought into intimate contact with the photo-curable resin cured inside the container 102. The lower surface 110a, which is a portion of the shaped object holding section 110 to be brought into intimate contact with the photo-curable resin, is made of a metal material such as aluminum or stainless steel, for example. The lower surface 110a is processed into a rough surface with minute irregularities by sandblasting.

The driving section 112 raises and lowers the shaped object holding section 110 in a vertical direction.

The controller 114 is configured and programmed to control the camera 108, the projector 106 and the driving section 112. The controller 114 is configured and programmed to store data of the first divided image P1 (see FIG. 16B) to be outputted to the projector 106a, and data of the second divided image P2 (see FIG. 16B) to be outputted to the projector 106b. The controller 114 is configured and programmed to further store data of the first sub-region $S_1$ of the image projection region R where the first divided image P1 is to be projected from the projector 106a, and data of the second sub-region $S_2$ of the image projection region R where the second divided image P2 is to be projected from the projector 106b.

The data of the first divided image P1 to be outputted to the projector 106a and the data of the second divided image P2 to be outputted to the projector 106b are stored in association with each other in the controller 114 in advance. Specifically, the data of the first divided image P1 and the data of the second divided image P2 are stored in association with each other in the controller 114 in advance so that the single large image A preferably includes the first divided image P1 projected from the projector 106a based on the data of the first divided image P1 outputted to the projector 106a; and the second divided image P2 projected from the projector 106b based on the data of the second divided image P2 outputted to the projector 106b.

The controller 114 is configured and programmed to simultaneously output, to the projectors 106a and 106b, the data of the first divided image P1 and the data of the second divided image P2 stored in association with each other, respectively.

The controller 114 is configured and programmed to sequentially output, to the projectors 106a and 106b, image data for each layer obtained when the three-dimensional shaped object is divided into a plurality of layers at regular time intervals. Thus, a given image is projected from each of the projectors 106a and 106b. Note that "to output image data for each layer to the projectors 106a and 106b" means "to simultaneously output, to the projectors 106a and 106b, the data of the first divided image P1 and the data of the second divided image P2, which are associated with each other, so as to provide image data for each layer". The controller 114 is configured and programmed to drive the driving section 112 at regular time intervals. Thus, the shaped object holding section 110 is raised by a given amount at regular time intervals.

The controller 114 is configured and programmed to correct the data of the first divided image P1 to be outputted to the projector 106a so that the first divided image P1 is projected in a proper state on the first sub-region $S_1$ of the image projection region R from the projector 106a. The controller 114 is configured and programmed to perform a process to calculate a projective transformation matrix necessary to correct the data of the first divided image P1 to be outputted to the projector 106a. The controller 114 is configured and programmed to perform correction of the data of the first divided image P1 and the projective transformation matrix calculation process irrespective of installation position and/or orientation of the projector 106a.

The controller 114 is configured and programmed to correct the data of the second divided image P2 to be outputted to the projector 106b so that the second divided image P2 is projected in a proper state on the second sub-region $S_2$ of the image projection region R from the projector 106b. The controller 114 is configured and programmed to perform a process to calculate a projective transformation matrix necessary to correct the data of the second divided image P2 to be outputted to the projector 106b. The controller 114 is configured and programmed to perform correction of the data of the second divided image P2 and the projective transformation matrix calculation process irrespective of installation position and/or orientation of the projector 106b.

The image projection system 10 according to the present preferred embodiment preferably includes at least the projector 106a, the projector 106b, the camera 108 and the controller 114.

The controller 114 is a computer and operations thereof are controlled by a central processing unit (hereinafter referred to as a "CPU") 12. The controller 114 is not limited to any particular type of computer. For example, the controller 114 may be a known personal computer or general-purpose computer, which is programmed to perform the functions described herein pursuant to instructions from program software so as to define a special purpose computer. The controller 114 is programmed and configured to define each of an image correction section 34, a checker intersection coordinate detection section 36, a first transformation matrix calculation section 38, a spatial code image generation section 40, a boundary coordinate acquisition section 42, a boundary line intersection acquisition section 44, a second transformation matrix calculation section 46, and an image data correction section 48, each of which is described in more detail below.

As illustrated in FIG. 2, the CPU 12 preferably is connected via a bus 14 with a storage device 16; a display device 18; a pointing device 20; a character input device 22; and an input-output interface circuit (I/O) 24 for various externally-connected devices. The storage device 16 preferably includes a read-only memory (ROM) and/or a random access memory (RAM). The ROM stores, for example, a program and/or various data for control performed by the CPU 12. The RAM preferably includes, for example, a storage region used as a working area for the CPU 12. The display device 18 displays various data based on control performed by the CPU 12. Examples of the display device 18 include a CRT monitor and a liquid crystal display. The pointing device 20 is an input device by which any position on a display screen of the display device 18 is designated. Examples of the pointing device 20 include a mouse. The character input device 22 is an input device by which any desired character is inputted. Examples of the character input device 22 include a keyboard.

In the image projection system 10, an external storage device 26 such as a hard disk is connected to the CPU 12 via the I/O 24 and the bus 14.

In the image projection system 10, a read-write device 30 is connected to the CPU 12 via the I/O 24 and the bus 14. The read-write device 30 allows various data produced based on control performed by the CPU 12 to be written and stored in a non-transitory computer readable storage medium 28 such as a CD or DVD (which will hereinafter simply be referred to as a "storage medium" as appropriate), and allows the various data stored in the storage medium 28 to be read into the storage device 16.

In the image projection system 10, the projectors 106a and 106b and the camera 108 provided in the stereolithography apparatus 100 are connected to the CPU 12 via the I/O 24 and the bus 14. Note that conventionally known devices may preferably be used as the projectors 106a and 106b and the camera 108, and therefore, detailed description thereof will be omitted.

For ease of understanding of the image projection system 10, the following description is based on the assumption that a program for carrying out a transformation matrix calculation process by the image projection system 10 and various data used for the transformation matrix calculation process are stored in advance in the storage device 16. The transformation matrix calculation process is performed to calculate projective transformation matrices used for correction of the first and second divided images P1 and P2.

The program for carrying out the transformation matrix calculation process and the various data used for the transformation matrix calculation process may be read into the RAM of the storage device 16 from outside through communication.

The first and second divided images P1 and P2 to be projected from the projectors 106a and 106b, respectively, are obtained by dividing each of a plurality of images (i.e., the large images A), representing a cross-sectional shape of a three-dimensional shaped object to be produced, into an image to be projected on the first sub-region $S_1$ from the projector 106a and an image to be projected on the second sub-region $S_2$ from the projector 106b. These images are generated by, for example, a personal computer provided separately. In the present preferred embodiment, the images generated by the separately provided personal computer are outputted to the image projection system 10 and stored in the storage device 16.

Figure 3:
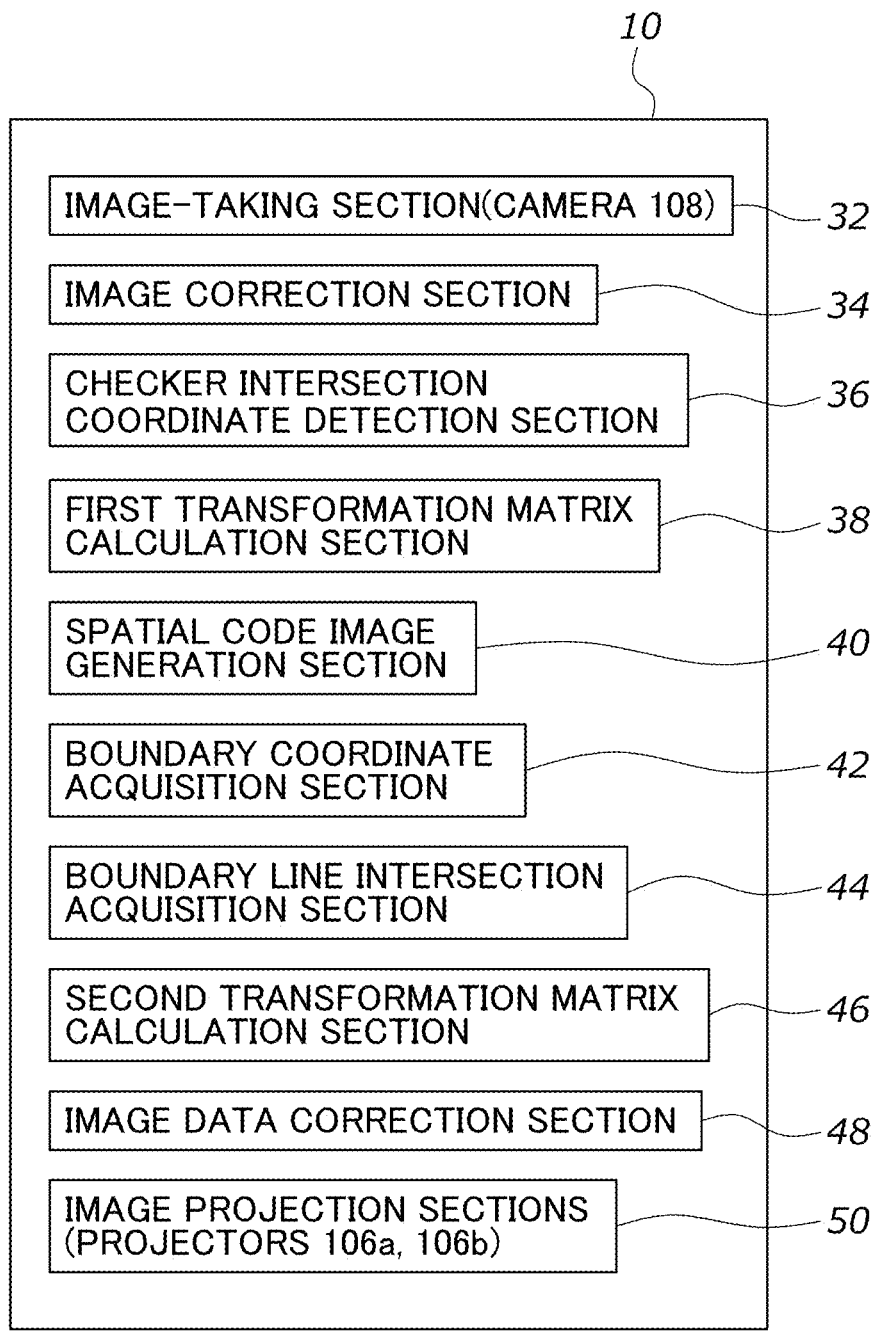
FIG. 3 is a block diagram illustrating main elements of the image projection system according to a preferred embodiment of the present invention.

Next, the image projection system 10 according to the present preferred embodiment will be described with reference to FIG. 3. FIG. 3 is a block diagram illustrating main elements of the image projection system 10 according to the present preferred embodiment.

The image projection system 10 according to the present preferred embodiment preferably includes an image-taking section 32, an image correction section 34, a checker intersection coordinate detection section 36, a first transformation matrix calculation section 38, a spatial code image generation section 40, a boundary coordinate acquisition section 42, a boundary line intersection acquisition section 44, a second transformation matrix calculation section 46, an image data correction section 48, and image projection sections 50.

The image-taking section 32 is configured to take an image of the entire image projection region of the bottom wall 102a of the container 102. In the present preferred embodiment, the image-taking section 32 is the camera 108, for example.

Figure 15:
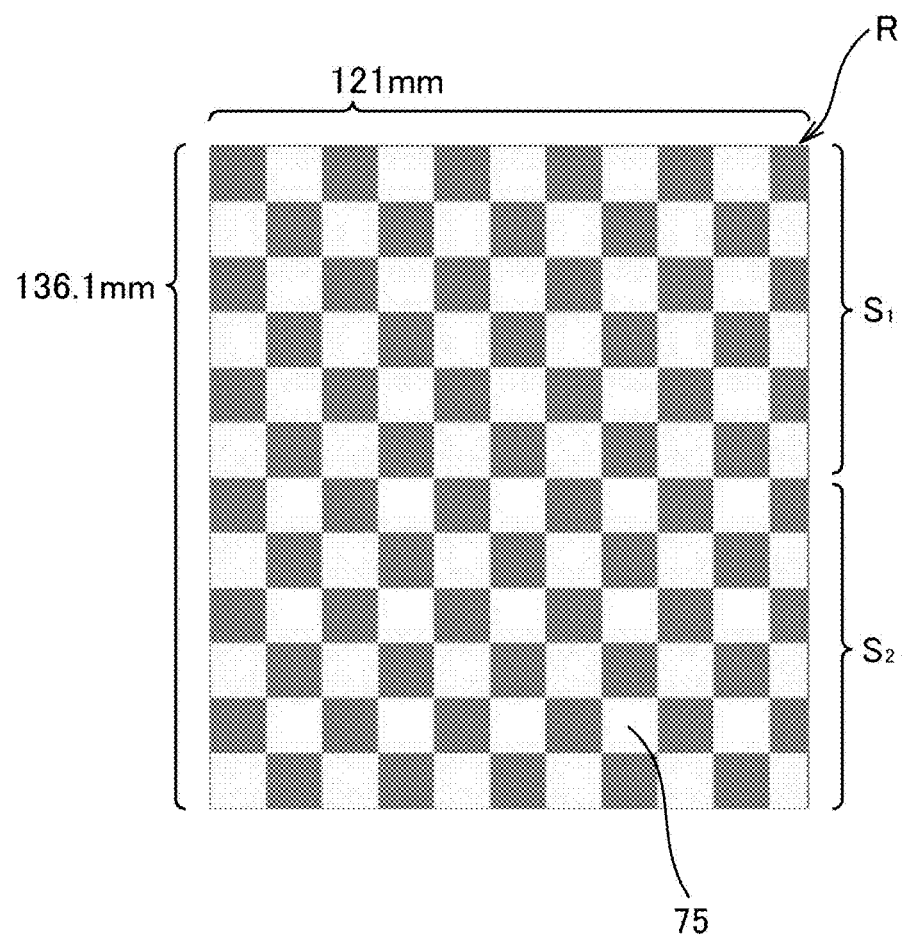
FIG. 15 is an explanatory representation illustrating an example of a checkered sheet used in the image projection system according to a preferred embodiment of the present invention.

When an image of a checkered sheet 75 (see FIG. 15) placed on an upper surface 102aa (see FIG. 1) of the bottom wall 102a of the container 102 has been taken by the image-taking section 32, the image correction section 34 is configured to correct the taken checkered sheet image by using internal parameters of the camera 108, i.e., the image-taking section 32. The checkered sheet 75 is placed on the upper surface 102aa of the bottom wall 102a by a worker.

The checker intersection coordinate detection section 36 is configured to detect, with sub-pixel precision, checker intersection coordinates in the corrected checkered sheet image.

The first transformation matrix calculation section 38 is configured to calculate a projective transformation matrix $H_1$ for projective transformation of the detected checker intersection coordinates into coordinates in the known image projection region.

The spatial code image generation section 40 is configured to generate a spatial code image whose code value changes in a longitudinal direction and a spatial code image whose code value changes in a lateral direction.

The boundary coordinate acquisition section 42 is configured to acquire, with sub-pixel precision, boundary coordinates of gray scale values in the spatial code images.

The boundary line intersection acquisition section 44 is configured to acquire boundary lines between the gray scale values adjacent to each other in each of the spatial code image whose code value changes in the longitudinal direction and the spatial code image whose code value changes in the lateral direction. Then, the boundary line intersection acquisition section 44 is configured to combine the spatial code image whose code value changes in the longitudinal direction and the spatial code image whose code value changes in the lateral direction, thus acquiring first intersection coordinates at which the boundary lines intersect with each other.

Using the projective transformation matrix $H_1$, the second transformation matrix calculation section 46 is configured to transform the first intersection coordinates acquired by the boundary line intersection acquisition section 44. The second transformation matrix calculation section 46 is configured to calculate a projective transformation matrix $H_2$ for projective transformation of the transformed first intersection coordinates into second intersection coordinates distributed over an entire target sub-region of the image projection region.

Using the calculated projective transformation matrix $H_2$, the image data correction section 48 is configured to correct image data of an image projected from each image projection section 50.

Each image projection section 50 is configured to project the image on a given sub-region of the image projection region based on the corrected image data. In the present preferred embodiment, the image projection sections 50 are the projectors 106a and 106b.

The following description will be made based on the assumption that the large image A (see FIG. 16B) is projected on the image projection region R (see FIG. 16A) by the image projection system 10.

The following description provides an example in which, preferably, a camera, a camera lens, projectors and a checkered sheet which meet the following specifications are used. Note that the specifications of the camera, camera lens, projectors and checkered sheet are not limited to the following specifications, but may be changed as appropriate.

The camera is ARTCAM-130MI-BI manufactured by ARTRAY CO., LTD. (1280 by 1024 pixels, B/W).

The camera lens is a Computar megapixel lens with a focal length of 12 mm.

Each projector is manufactured to specifications that include 854 by 480 pixels. Each projector is used so that an input image size is 1366 by 768 pixels.

The checkered sheet is provided as follows. A checkered pattern (i.e., a shaping region) is designed for a size conforming to an aspect ratio of a region size of 1366 by 1536 pixels obtained when the two projectors each having a resolution of 1366 by 768 pixels are longitudinally connected to each other. A total size of the checkered sheet 75 is 121 mm by 136.1 mm. When a set value for a lateral size is 121 mm, a longitudinal size is calculated by 121×1536/1366. The calculated value is rounded to one decimal place, and the rounded value, i.e., 136.1, is obtained as a value for the longitudinal size. Checkers of the checkered pattern are arranged over the entire checkered sheet 75 so that the twelve checkers are located along the longitudinal direction of the checkered sheet 75. The total size is adjusted to the shaping region (i.e., the image projection region) in the stereolithography apparatus 100. The checkered sheet 75 is made of, for example, paper which allows projection light to pass therethrough and on which the checkered pattern is printed.

First, a camera calibration is performed in the image projection system 10. The camera calibration is performed at a given time, e.g., at the time of shipment from a factory or at the time of adjustment of the projectors 106a and 106b. Camera internal parameters obtained by the camera calibration are stored in the storage device 16. The camera calibration is performed using a separate display device (e.g., a liquid crystal display) which is independent of the image projection system 10. Specifically, in performing the camera calibration, an image of the checkered pattern is taken by the camera 108 at the maximum angle of view, and camera parameters are calculated using Zhang's method. In this preferred embodiment, as this checkered pattern, a checkered pattern displayed on the separate display device is used instead of the checkered pattern rendered on the checkered sheet 75 (see FIG. 15) placed on the upper surface 102aa of the bottom wall 102a of the container 102. Note that a technique disclosed in JP 2007-309660 A, for example, is used for a method of calculating camera parameters by Zhang's method, and therefore, detailed description thereof will be omitted.

In performing the camera calibration, a SAMSUNG B2430 (with 1920 by 1080 pixels and a dot pitch of 0.2768 mm), for example, is used as the display device. A 12 by 10 checkered pattern in which a size of each checker is 11.9024 mm square is displayed on this display device, and images of this checkered pattern are taken from five different directions by the camera 108 whose front end is located about 300 mm away from a surface of the display device.

After the camera calibration has been performed, the camera 108 is installed on the stereolithography apparatus 100.

When the image projection system 10 is used, only internal parameters of the camera, which include lens distortion coefficients, are utilized by using Equations (1) and (2) calculated by Zhang's method.

Eq. 1

$$s\tilde{m} = A[RT]\tilde{M} \qquad (1)$$

In Equation (1), "A" represents an internal parameter of the camera 108, "R" represents a rotation matrix of the camera 108, "T" represents a translation vector, and "[RT]" represents an external parameter of the camera 108.

Eq. 2

$$\begin{cases} u_d = u + (u - u_0)[k_1(x^2 + y^2) + h_2(x^2 + y^2)^2] \\ v_d = v + (v - v_0)[k_1(x^2 + y^2) + k_2(x^2 + y^2)^2] \end{cases} \qquad (2)$$

In Equation (2), "$u_d$" and "$V_d$" represent image coordinates after distortion, "$u_0$" and "$v_0$" represent image center coordinates, and "$k_1$" and "$k_2$" represent distortion coefficients.

With the camera internal parameters stored in the storage device 16, a worker places the checkered sheet 75 (see FIG. 15) on the upper surface 102aa of the bottom wall 102a of the container 102. Then, with the checkered sheet 75 placed inside the container 102, the worker takes an image of the checkered sheet 75 by using the camera 108 (i.e., the image-taking section 32) via the lens. The taken checkered sheet image is stored in the storage device 16.

Figure 4A:
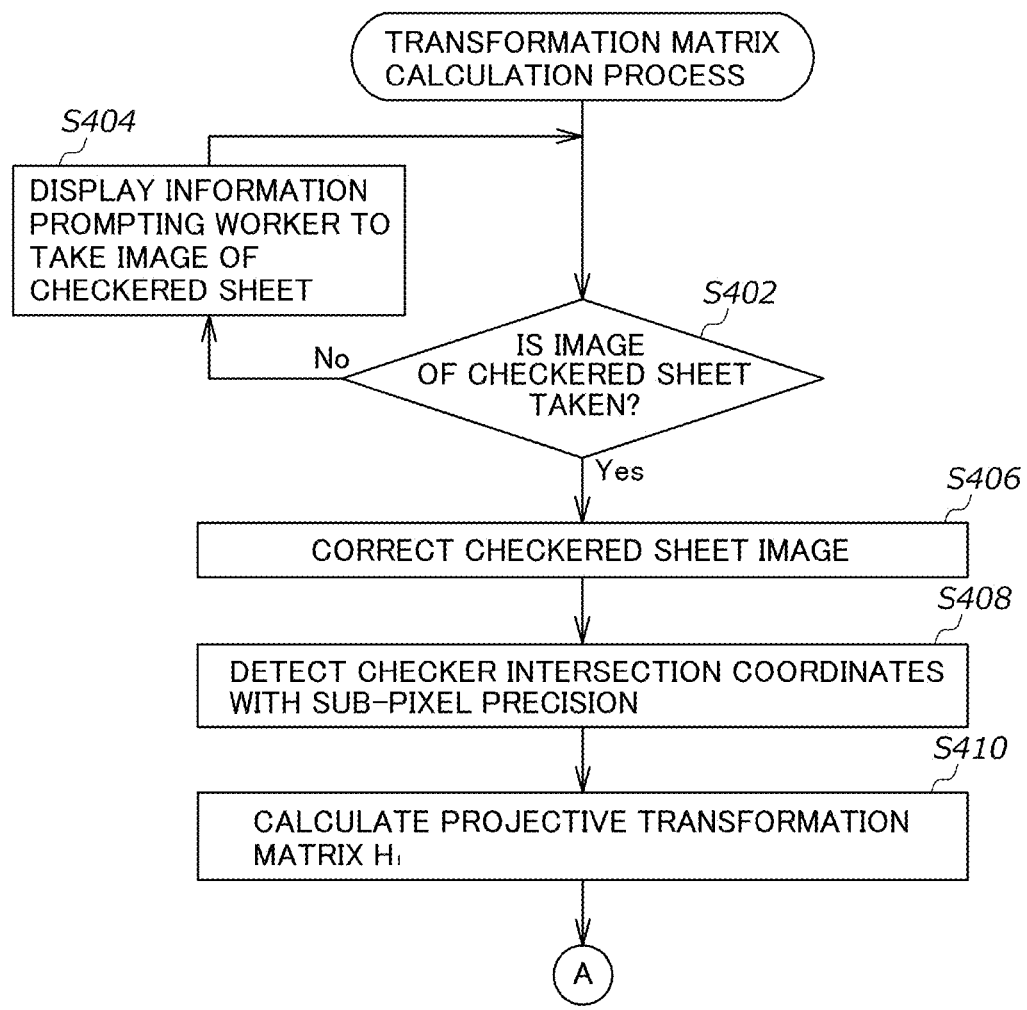
FIGS. 4A and 4B are flow charts illustrating a transformation matrix calculation process performed in the image projection system according to a preferred embodiment of the present invention.
Figure 4B:
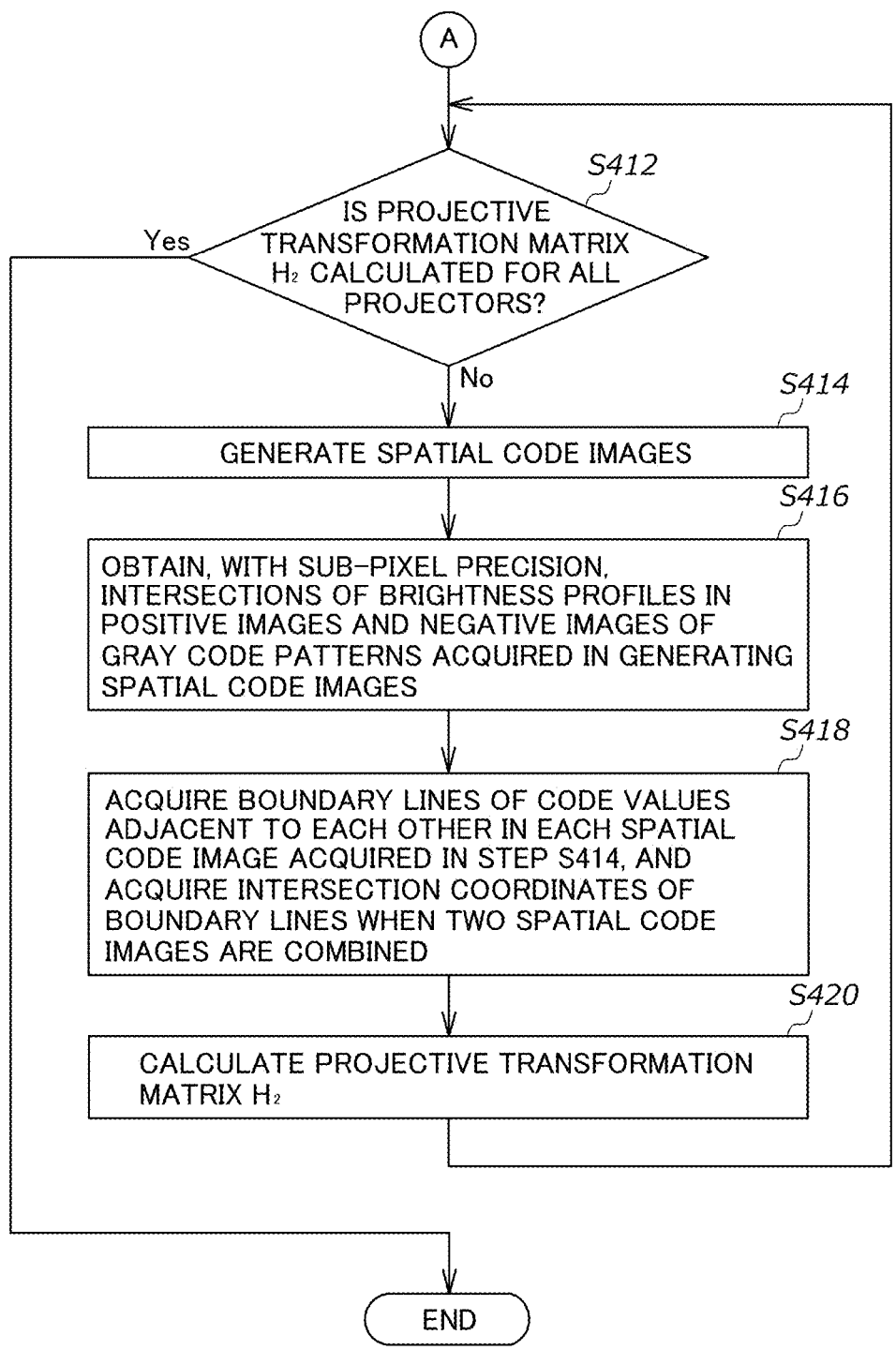

Next, a procedure to perform a transformation matrix calculation process by the image projection system 10 for which the camera calibration has been performed will be described with reference to FIGS. 4A and 4B.

The worker initially provides an instruction for start of transformation matrix calculation by using the pointing device 20 and/or the character input device 22. Thus, the transformation matrix calculation process starts in the image projection system 10.

First, upon start of the transformation matrix calculation process, whether or not an image of the checkered sheet 75 has been taken is determined in Step S402. Specifically, the controller 114 is configured and programmed to determine whether or not a checkered sheet image is stored in the storage device 16.

Upon determination in Step S402 that an image of the checkered sheet 75 has not been taken, i.e., upon determination in Step S402 that no checkered sheet image is stored in the storage device 16, the process proceeds to Step S404. In contrast, upon determination in Step S402 that an image of the checkered sheet 75 has been taken, i.e., upon determination in Step S402 that a checkered sheet image is stored in the storage device 16, the process proceeds to Step S406.

In Step S404, information that prompts the worker to take an image of the checkered sheet 75 is displayed on the display device 18. Then, the process returns to Step S402.

In Step S406, using the internal parameters of the camera 108, the image correction section 34 is configured to correct lens-induced distortion of the checkered sheet image stored in the storage device 16.

Subsequently, in Step S408, the checker intersection coordinate detection section 36 is configured to detect, with sub-pixel precision, checker intersection coordinates in the checkered sheet image corrected in Step S406.

Figure 5:
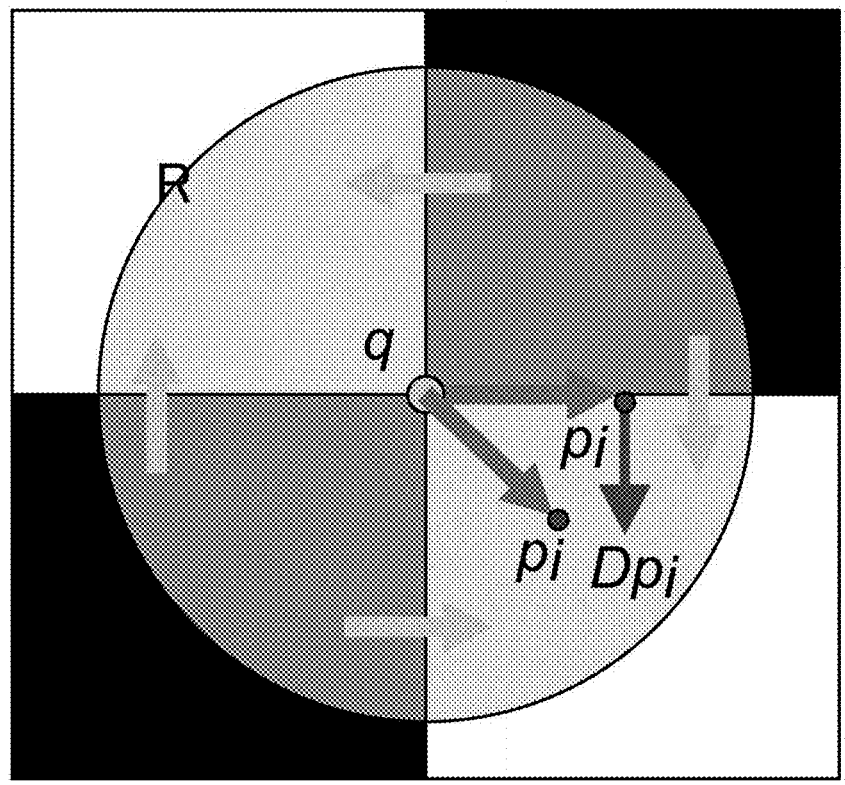
FIG. 5 is an explanatory diagram illustrating a sub-pixel estimation method for checker intersection coordinates.

In Step S408, sub-pixels of the checker intersection coordinates are estimated. As illustrated in FIG. 5, at a boundary between checkers in the checkered pattern, a vector $p_i$-q and a brightness gradient vector $Dp_i$ are perpendicular to each other, and an inner product value $\epsilon_i$ thereof is 0. "q" represents center coordinates with desired sub-pixel precision. "$p_i$" represents coordinates of each point within a circular field of view R. "$Dp_i$" represents a brightness gradient vector for $p_i$.

When q is a true intersection, a sum total of the inner product values $\epsilon_i$ is closest to 0. In contrast, when q is a point other than a true intersection, each inner product value $\epsilon_i$ is greater than 0, so that a sum total of the inner product values $\epsilon_i$ is also greater than 0. Therefore, using a nonlinear least squares method (Levenberg-Marquardt method), the sub-pixel coordinates q at which a sum of squares of all the inner product values $\epsilon_i$ is minimized are calculated by the following equation.

$$\sum_i \varepsilon_i^2 = \sum_i (Dp_i^\tau \cdot (p_i - q))^2 \qquad \text{Eq. 3}$$

In Step S410, the first transformation matrix calculation section 38 is configured to calculate the projective transformation matrix $H_1$ for transformation of the detected checker intersection coordinates into coordinates in the known image projection region R. In this preferred embodiment, checker intersection coordinates obtained when an image of the checkered sheet 75 (see FIG. 15) located in the image projection region R is taken from an appropriate position are stored in advance in the storage device 16. The checker intersection coordinates adjacent to each other in the image projection region R are located at equal intervals. The term "appropriate position" refers to, for example, a position at which the checkered sheet 75 is located at the maximum angle of view of the camera 108, and a line of sight of the camera 108 and the checkered sheet 75 are perpendicular to each other.

As illustrated in FIG. 6, the projective transformation matrix $H_1$ calculated in Step S410 is used for projective transformation of the checker intersection coordinates (camera image coordinate system) detected in Step S408 into the checker intersection coordinates (coordinate system of a shaping region, i.e., the image projection region) stored in the storage device 16.

A method of calculating the projective transformation matrix $H_1$ will be described below.

As the projective transformation matrix $H_1$, a projective transformation matrix H by which source image coordinates (xs, ys) equivalent to the checker intersection coordinates detected in Step S408 are transformed into target image coordinates (xt, yt) equivalent to the checker intersection coordinates stored in the storage device 16 is obtained.

Eq. 4

$$s \begin{bmatrix} x_t \\ y_t \\ 1 \end{bmatrix} = H \begin{bmatrix} x_s \\ y_s \\ 1 \end{bmatrix}, H = \begin{bmatrix} h_{11} & h_{12} & h_{13} \\ h_{21} & h_{22} & h_{23} \\ h_{31} & h_{32} & h_{33} \end{bmatrix} \qquad (4)$$

n sets of image coordinate values obtained before and after the transformation are applied to Equation (4).

$$\begin{cases} sx_{tn} = h_{11}x_{sn} + h_{12}y_{sn} + h_{13} \\ sy_{tn} = h_{21}x_{sn} + h_{22}y_{sn} + h_{23} \\ s = h_{31}x_{sn} + h_{32}y_{sn} + h_{33} \end{cases} \qquad \text{Eq. 5}$$

$$\begin{cases} h_{11}x_{sn} + h_{12}y_{sn} + h_{13} - h_{31}x_{sn}x_{tn} - h_{32}y_{sn}x_{tn} - h_{33}x_{tn} = 0 \\ h_{21}x_{sn} + h_{22}y_{sn} + h_{23} - h_{31}x_{sn}y_{tn} - h_{32}y_{sn}y_{tn} - h_{33}y_{tn} = 0 \end{cases} \qquad \text{Eq. 6}$$

$$\begin{bmatrix} x_{s1} & y_{s1} & 1 & 0 & 0 & 0 & -x_{s1}x_{t1} & -y_{s1}x_{t1} & -x_{t1} \\ 0 & 0 & 0 & x_{s1} & y_{s1} & 1 & -x_{s1}y_{t1} & -y_{s1}y_{t1} & -y_{t1} \\ & & & & \vdots & & & & \\ x_{sn} & y_{sn} & 1 & 0 & 0 & 0 & -x_{sn}x_{tm} & -y_{sn}x_{tm} & -x_{tm} \\ 0 & 0 & 0 & x_{sn} & y_{sn} & 1 & -x_{sn}y_{tm} & -y_{sn}y_{tm} & -y_{tm} \end{bmatrix} \begin{bmatrix} h_{11} \\ h_{12} \\ \vdots \\ h_{32} \\ h_{33} \end{bmatrix} = \begin{bmatrix} 0 \\ 0 \\ \vdots \\ 0 \\ 0 \end{bmatrix} \qquad \text{Eq. 7}$$

When this equation (Eq. 7) is expressed as B·h=0, h is obtained as a right singular vector corresponding to the minimal singular value of B or a characteristic vector corresponding to the minimal characteristic value of $B^T B$ (for example, a function such as SVD::solveZ( ) is utilized for OpenCV 2.x). Note that a conventionally known technique (see, for example, Gang Xu, 3D CG from Photographs, Kindai Kagaku Sha), for example, is preferably used for such a technique, and therefore, detailed description thereof will be omitted.

When the projective transformation matrix $H_1$ has been calculated in Step S410, the process then proceeds to Step S412 to determine whether or not the projective transformation matrix $H_2$ has been calculated for all the projectors, e.g., the projectors 106a and 106b. The controller 114 is configured and programmed to determine whether or not the projective transformation matrix $H_2$ has been calculated. The controller 114 is configured and programmed to determine whether or not the projective transformation matrix $H_2$ calculated for each of the projectors 106a and 106b is stored in the storage device 16.

Upon determination in Step S412 that the projective transformation matrix $H_2$ has not been calculated for all the projectors (e.g., the projectors 106a and 106b), i.e., upon determination in Step S412 that there is/are projector(s) for which the projective transformation matrix $H_2$ is not stored, the process proceeds to Step S414. In contrast, upon determination in Step S412 that the projective transformation matrix $H_2$ has been calculated for all the projectors (e.g., the projectors 106a and 106b), i.e., upon determination in Step S412 that there is no projector for which the projective transformation matrix $H_2$ is not stored, the transformation matrix calculation process ends.

In Step S414, the controller 114 is configured and programmed to select one of the projectors for which the projective transformation matrix $H_2$ has not yet been calculated. The spatial code image generation section 40 is configured to generate spatial code images for the selected projector. For example, serial numbers may be assigned to the projectors, and the projector having the smallest serial number may be selected.

An example where spatial code images are generated for the projector 106a will be described below. First, an 8-bit Gray code pattern is projected on the bottom wall 102a of the container 102 from the projector 106a. The camera 108 takes an image of the projected Gray code pattern. The spatial code image generation section 40 is configured to generate a spatial code image from each taken image. The 8-bit Gray code pattern projected from the projector 106a is stored in advance in the storage device 16. The controller 114 is configured and programmed to sequentially output, to the projector 106a, data of the 8-bit Gray code pattern at a given time.

Specifically, the controller 114 is configured and programmed to sequentially output, to the projector 106a, data of positive images of a vertical Gray code pattern and data of negative images of a vertical Gray code pattern which are stored in advance in the storage device 16. Then, as illustrated in FIG. 7A, the 8-bit vertical Gray code patterns are projected as the positive images and negative images on the bottom wall 102a of the container 102 from the projector 106a.

An image of each of the projected Gray code patterns is taken by the camera 108. The taken positive images of the vertical Gray code pattern and the taken negative images of the vertical Gray code pattern are outputted to the spatial code image generation section 40.

Using the internal parameters of the camera 108, the spatial code image generation section 40 is configured to correct lens distortion of each of the taken images. As illustrated in FIG. 7B, the spatial code image generation section 40 is configured to generate binary images from differences between brightness values of the corrected 8-bit positive images and brightness values of the corrected 8-bit negative images. Then, as illustrated in FIG. 7C, the spatial code image generation section 40 is configured to generate, from the 8-bit binary images, a spatial code image whose code value changes in a lateral direction (i.e., a gray scale image whose brightness value changes in the lateral direction in the range of 0 to 255).

Furthermore, the controller 114 is configured and programmed to sequentially output, to the projector 106a, data of positive images of a horizontal Gray code pattern and data of negative images of a horizontal Gray code pattern which are stored in advance in the storage device 16. Then, as illustrated in FIG. 8A, the 8-bit horizontal Gray code patterns are projected as the positive images and negative images on the bottom wall 102a of the container 102 from the projector 106a.

An image of each of the projected Gray code patterns is taken by the camera 108. The taken positive images of the horizontal Gray code pattern and the taken negative images of the horizontal Gray code pattern are outputted to the spatial code image generation section 40.

Using the internal parameters of the camera 108, the spatial code image generation section 40 is configured to correct lens distortion of each of the taken images. As illustrated in FIG. 8B, the spatial code image generation section 40 is configured to generate binary images from differences between brightness values of the corrected 8-bit positive images and brightness values of the corrected 8-bit negative images. Then, as illustrated in FIG. 8C, the spatial code image generation section 40 is configured to generate, from the 8-bit binary images, a spatial code image whose code value changes in a longitudinal direction (i.e., a gray scale image whose brightness value changes in the longitudinal direction in the range of 0 to 255).

Figure 9A:
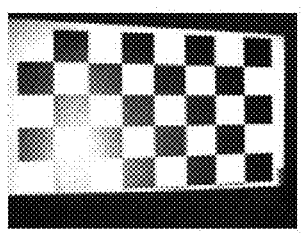
FIG. 9A is an explanatory representation illustrating a "totally projected image".
Figure 9B:
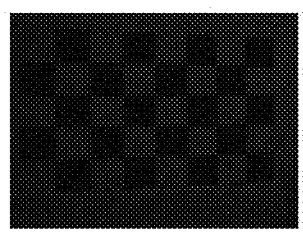
FIG. 9B is an explanatory representation illustrating a "totally blacked out image".
Figure 9C:
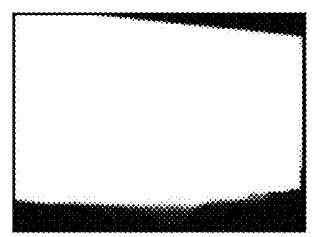
FIG. 9C is an explanatory representation illustrating a mask image generated from the totally projected image illustrated in FIG. 9A and the totally blacked out image illustrated in FIG. 9B.

Note that in Step S414, in order to mask pixels of a portion of the image projection region where no image is projected from the projector 106a, the spatial code image generation section 40 is configured to generate a "totally projected image" and a "totally blacked out image". As used herein, the term "totally projected image" refers to an image obtained when the entire image projection region is irradiated with light outputted from the projector 106a (see FIG. 9A), and the term "totally blacked out image" refers to an image obtained when the entire image projection region is not irradiated at all with light from the projector 106a (see FIG. 9B). Then, the spatial code image generation section 40 is configured to make a comparison between brightness of the totally projected image and brightness of the totally blacked out image in each given pixel so as to generate a mask image (see FIG. 9C) in which lower brightness in each pixel is 0.

In Step S416, the boundary coordinate acquisition section is configured to acquire, with sub-pixel precision, an intersection of a brightness profile of the corrected positive images of the Gray code pattern and a brightness profile of the corrected negative images of the Gray code pattern which are acquired in Step S414.

Figure 10:
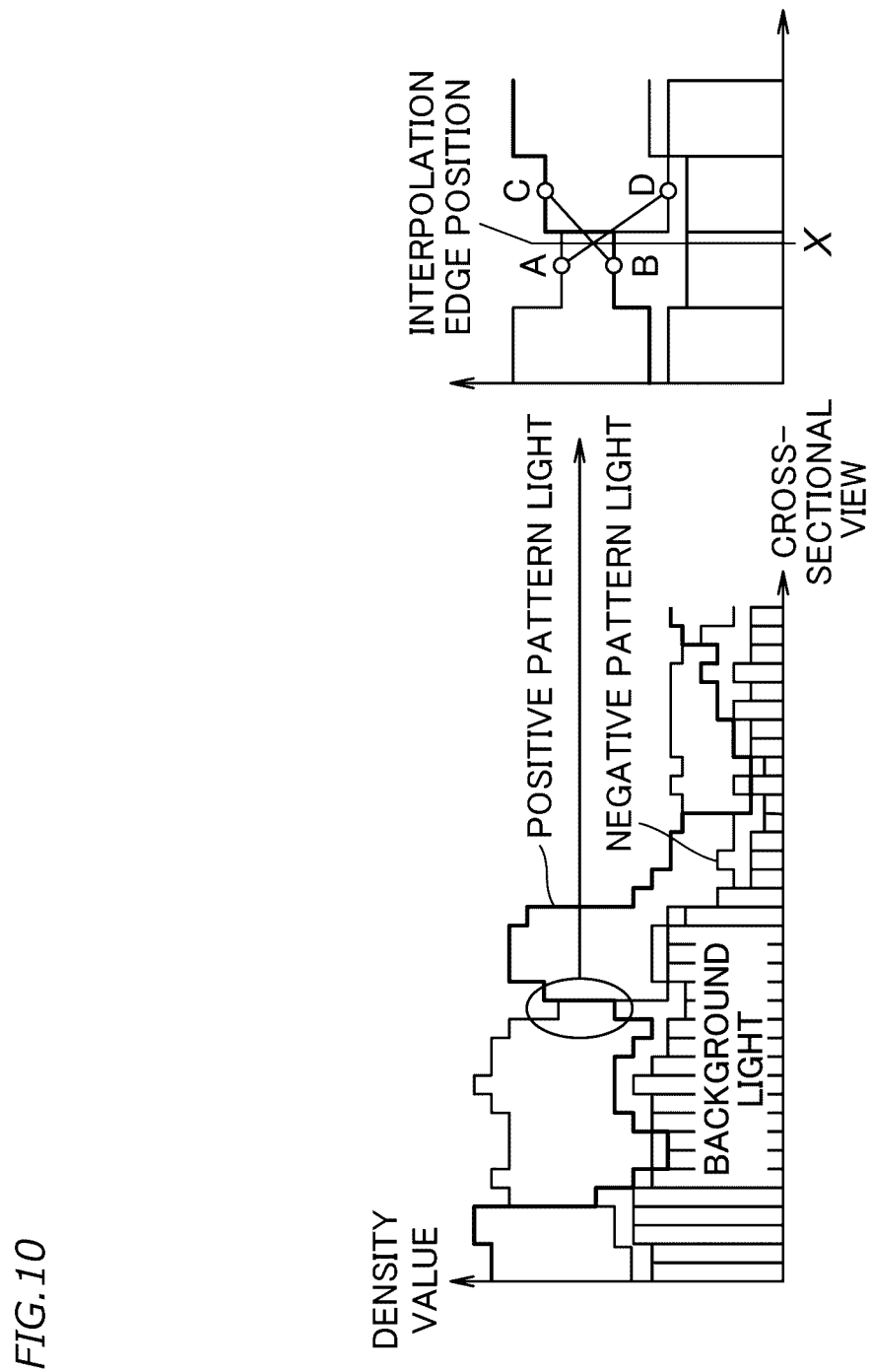
FIG. 10 is an explanatory diagram illustrating a method for obtaining an intersection of brightness profiles which serves as boundary coordinates with sub-pixel precision.

Specifically, as illustrated in FIG. 10, the boundary coordinate acquisition section 42 is configured to obtain, with sub-pixel precision, an intersection of the brightness profiles in the corrected 8-bit positive images and negative images of the vertical Gray code pattern. This intersection serves as boundary coordinates obtained with sub-pixel precision for the code value of the spatial code image whose code value changes in the lateral direction.

Furthermore, as illustrated in FIG. 10, the boundary coordinate acquisition section 42 is configured to obtain, with sub-pixel precision, an intersection of the brightness profiles in the corrected 8-bit positive images and negative images of the horizontal Gray code pattern. This intersection serves as boundary coordinates obtained with sub-pixel precision for the code value of the spatial code image whose code value changes in the longitudinal direction.

Note that a conventionally known technique (see, for example, Kosuke Sato and Seiji Inokuchi, 3D Imaging Techniques for Measurement, Syokoudo) preferably is used for a method of calculating, with sub-pixel precision, boundary coordinates for a code value of a spatial code image, and therefore, detailed description thereof will be omitted.

In Step S418, the boundary line intersection acquisition section 44 is configured to acquire boundary lines connecting the boundary coordinates of the same code value in each of the spatial code images acquired in Step S414, i.e., the spatial code image whose code value changes in the lateral direction and the spatial code image whose code value changes in the longitudinal direction. Then, the boundary line intersection acquisition section 44 is configured to combine the spatial code image whose code value changes in the lateral direction and the spatial code image whose code value changes in the longitudinal direction, and thus acquires the first intersection coordinates including the boundary line in the spatial code image whose code value changes in the lateral direction; and the boundary line in the spatial code image whose code value changes in the longitudinal direction.

Specifically, the boundary line intersection acquisition section 44 is configured to acquire the boundary lines connecting the boundary coordinates of the same code value based on the boundary coordinates obtained with sub-pixel precision for the code values in the spatial code images calculated in Step S416. Assuming that a boundary line between a "code value n" and a "code value n+1" adjacent to the "code value n" is defined as a "boundary n", n (=0 to 254 [maximum value]) boundary lines are obtained in the spatial code image whose code value changes in the lateral direction. These boundary lines are arranged in the longitudinal direction. Furthermore, n (=0 to 254 [maximum value]) boundary lines are obtained in the spatial code image whose code value changes in the longitudinal direction. These boundary lines are arranged in the lateral direction.

Note that when the above-mentioned projector manufactured to specifications which include an input image size of 1366 by 768 pixels is used, n (=0 to 226) boundary lines are obtained in the spatial code image whose code value changes in the lateral direction, and n (=0 to 254) boundary lines are obtained in the spatial code image whose code value changes in the longitudinal direction.

Figure 11:
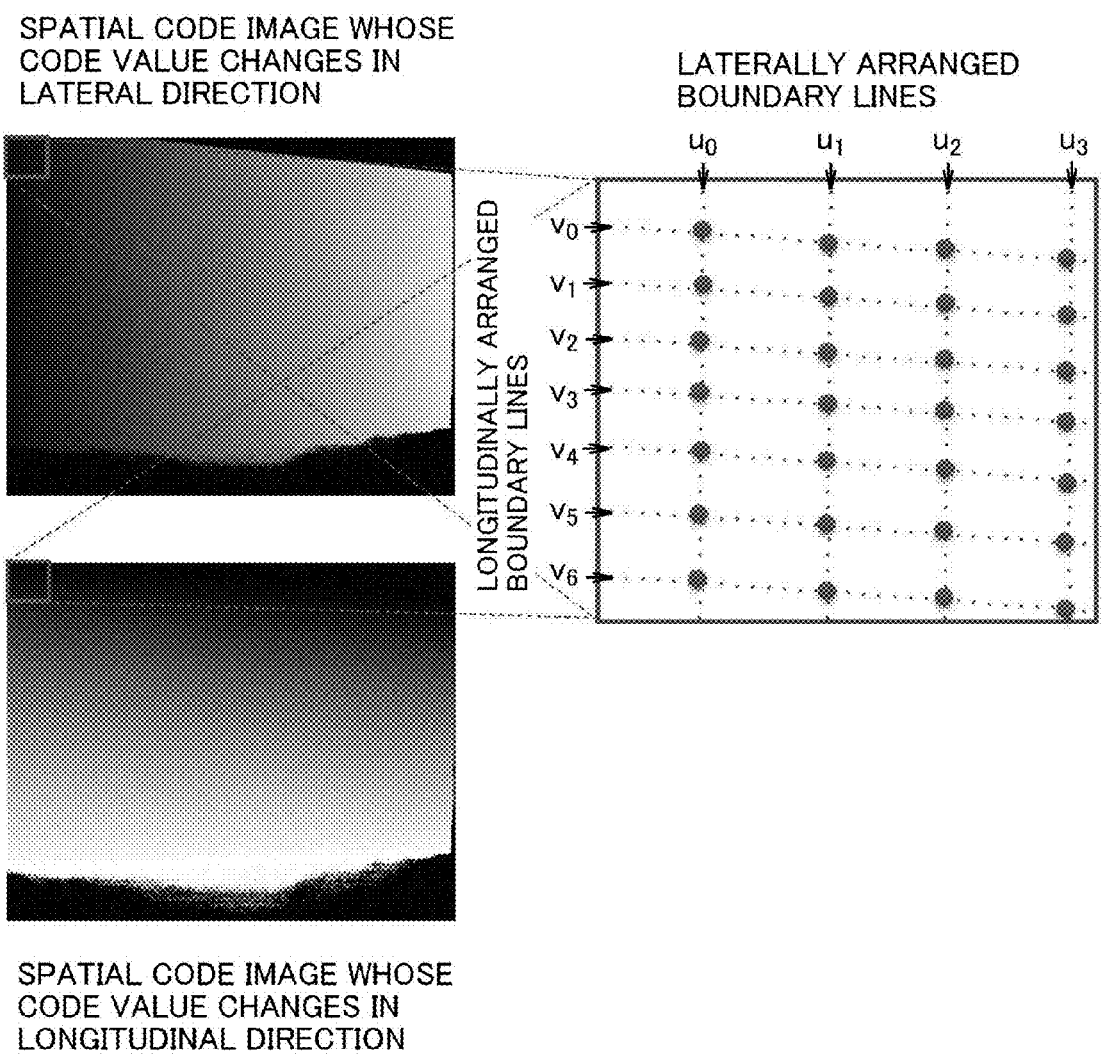
FIG. 11 is an explanatory representation illustrating intersections of boundary lines in the spatial code image whose code value changes in the lateral direction, and boundary lines in the spatial code image whose code value changes in the longitudinal direction.
Figure 12:
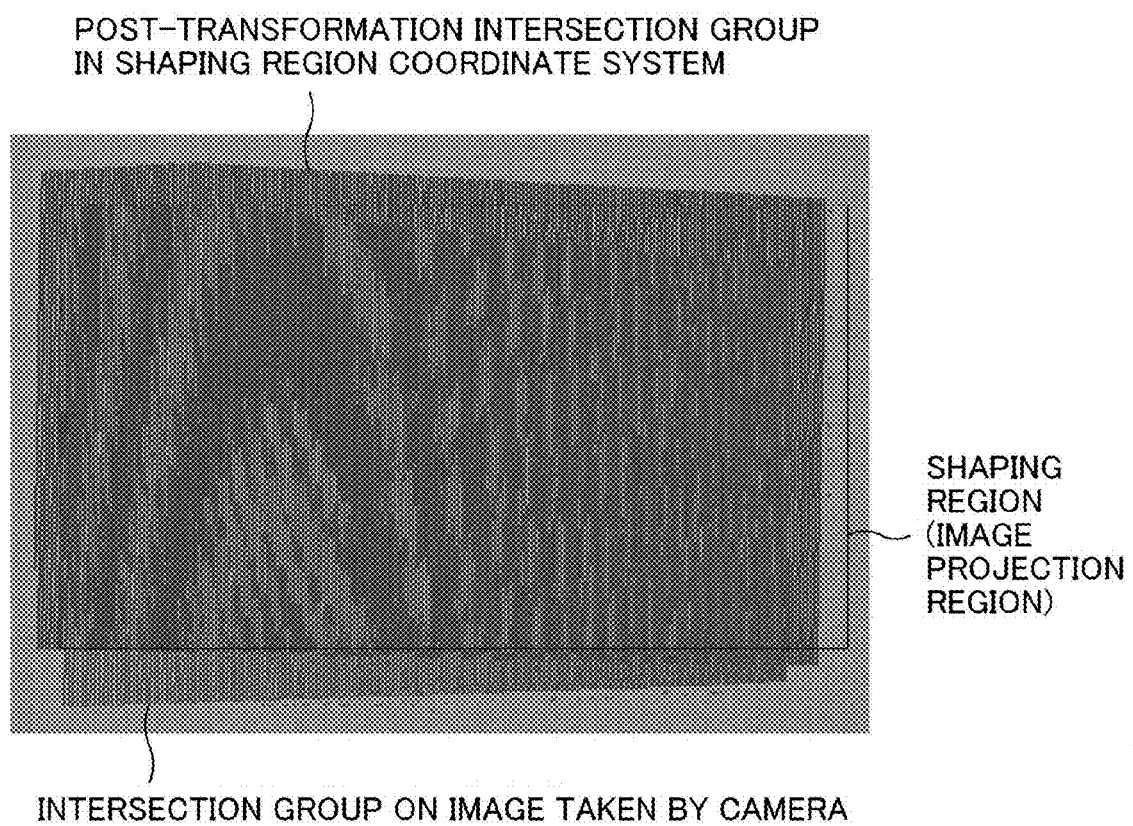
FIG. 12 is an explanatory representation illustrating an intersection group on an image taken by a camera, an intersection group obtained after transformation from a camera image coordinate system into a shaping region coordinate system, and a shaping region.
Figure 13A:
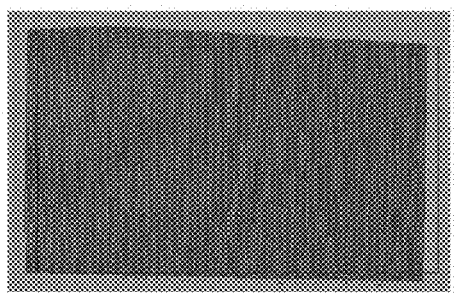
FIG. 13A is an explanatory representation illustrating an intersection group obtained after transformation using a projective transformation matrix $H_1$.
Figure 13B:
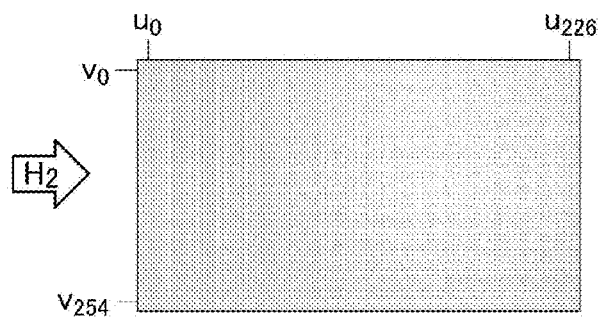
FIG. 13B is an explanatory representation illustrating an intersection group ideally arranged in the shaping region.
Figure 13C:
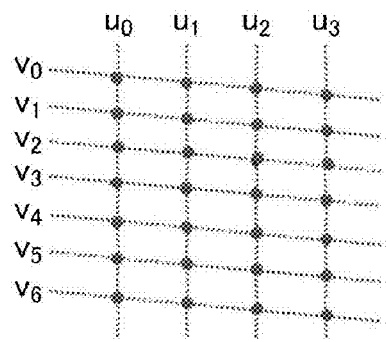
FIG. 13C is an explanatory diagram illustrating, in an enlarged manner, an upper left end of the intersection group that is obtained after transformation using the projective transformation matrix $H_1$ and illustrated in FIG. 13A.
Figure 13D:
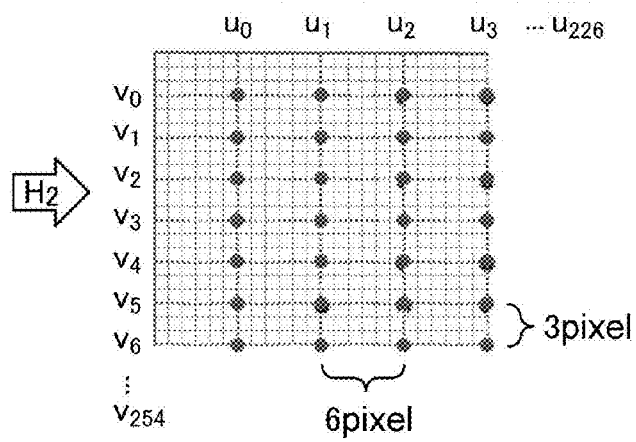
FIG. 13D is an explanatory diagram illustrating, in an enlarged manner, an upper left end of the intersection group that is ideally arranged in the shaping region and illustrated in FIG. 13B.

As illustrated in FIG. 11, upon acquisition of the boundary lines in the spatial code images, the boundary line intersection acquisition section 44 is configured to combine the spatial code image whose code value changes in the lateral direction and the spatial code image whose code value changes in the longitudinal direction, and thus to acquire the first intersection coordinates of the boundary lines arranged in the lateral direction and the boundary lines arranged in the longitudinal direction in the combined image. Note that in FIG. 11, the boundary lines arranged in the lateral direction are represented as Un (n=0 to 226), and the boundary lines arranged in the longitudinal direction are represented as Vn (n=0 to 254).

In Step S420, the second transformation matrix calculation section 46 is configured to calculate the projective transformation matrix $H_2$ for projective transformation of the first intersection coordinates of the boundary lines acquired in Step S418 into the second intersection coordinates distributed over the entire target sub-region of the image projection region.

Specifically, using the projective transformation matrix $H_1$ calculated in Step S410, the second transformation matrix calculation section 46 is configured to transform the acquired first intersection coordinates of the boundary lines into coordinates of the coordinate system of the shaping region which is the image projection region.

As illustrated in FIGS. 13A to 13D, using the above-described method, the second transformation matrix calculation section 46 is subsequently configured to calculate the projective transformation matrix $H_2$ for projective transformation of a group of intersections, which have been transformed into the coordinates of the coordinate system of the shaping region (i.e., the image projection region), into the second intersection coordinates distributed over an entire target sub-region of the shaping region.

In other words, the second transformation matrix calculation section 46 is configured to calculate the projective transformation matrix $H_2$ for transformation of the first intersection coordinates of the boundary lines acquired in Step S418 into the second intersection coordinates of the boundary lines in a normal image in which boundary lines are placed in a grid pattern on a projector image region (i.e., a region where an image is projected from the projector 106a).

When an input image size of the projector 106a is "X" by "Y" pixels, the second intersection coordinates of the boundary lines in the normal image are calculated as follows. First, the second transformation matrix calculation section 46 is configured to calculate, for "Y" (i.e., a size of a short side of an input image of the projector 106a), intervals (i.e., the number of pixels) at which the longitudinally arranged boundary lines (i.e., Vn) acquired in Step S418 are uniformly distributed.

The value of "j" obtained when the value of $\{Y+(j-1)\}/j$ is closest to the number of the longitudinally arranged boundary lines acquired in Step S418 is defined as an interval (i.e., the number of pixels) between the boundary lines adjacent to each other. Note that "j" is a positive integer.

For example, when the projector manufactured to specifications that include 854 by 480 pixels is used (with an input image size of 1366 by 768 pixels), the number of pixels for "Y" is "768", and the number of the longitudinally arranged boundary lines acquired in Step S418 is "255" (because the number of the boundary lines Vn is n=0 to 254). Therefore, "j" by which the value of $\{768+(j-1)\}/j$ is closest to "255" is obtained.

In this case, "j" is "3", and therefore, the longitudinally arranged boundary lines Vn are provided in the normal image so that an interval of 3 pixels is provided between the boundary lines adjacent to each other.

Subsequently, the second transformation matrix calculation section 46 is configured to calculate, for "X" (i.e., a size of a long side of an input image of the projector 106a), intervals (i.e., the number of pixels) at which the laterally arranged boundary lines (i.e., Un) acquired in Step S418 are uniformly distributed.

The value of "k" obtained when the value of $\{X+(k-1)\}/k$ is closest to the number of the laterally arranged boundary lines acquired in Step S418 is defined as an interval (i.e., the number of pixels) between the boundary lines adjacent to each other. Note that "k" is a positive integer.

For example, when the projector manufactured to specifications that include 854 by 480 pixels is used (with an input image size of 1366 by 768 pixels), the number of pixels for "X" is "1366", and the number of the laterally arranged boundary lines acquired in Step S418 is "227" (because the number of the boundary lines Un is n=0 to 226). Therefore, "k" by which the value of $\{1366+(k-1)\}/k$ is closest to "227" is obtained.

In this case, "k" is "6", and therefore, the laterally arranged boundary lines Un are provided in the normal image so that an interval of 6 pixels is provided between the boundary lines adjacent to each other.

Thus, the normal image in which the longitudinally arranged boundary lines Vn and the laterally arranged boundary lines Un are provided in a grid pattern is obtained. The second transformation matrix calculation section 46 is configured to calculate the second intersection coordinates of the boundary lines Vn and the boundary lines Un in this normal image.

Alternatively, the second intersection coordinates of the boundary lines in such a normal image may be calculated in advance, or may be acquired when the projective transformation matrix $H_2$ is calculated in Step S420.

The second transformation matrix calculation section 46 is configured to calculate the projective transformation matrix $H_2$ by which the first intersection coordinates of the longitudinally arranged boundary lines Vn and the laterally arranged boundary lines Un, obtained when the spatial code images are combined in Step S418, are transformed into the second intersection coordinates of the boundary lines in the normal image.

A method of calculating the projective transformation matrix $H_2$ in this case is similar to the method of calculating the projective transformation matrix $H_1$. When the projective transformation matrix $H_2$ is calculated, the source image coordinates (xs, ys) are defined as the intersection coordinates obtained by transforming, using the projective transformation matrix $H_1$, the first intersection coordinates into coordinate values of the coordinate system of the shaping region which is the image projection region, and the target image coordinates (xt, yt) are defined as the second intersection coordinates of the boundary lines in the normal image.

In this case, the intersection coordinates, i.e., the source image coordinates (xs, ys), obtained by transforming the first intersection coordinates into the coordinate values of the shaping region coordinate system by using the projective transformation matrix $H_1$ calculated in Step S410, and the second intersection coordinates of the boundary lines, i.e., the target image coordinates (xt, yt), in the normal image, are transformed into coordinates of a local coordinate system of the first sub-region $S_1$ (see FIG. 16A) where an image is projected from the projector 106a for which the projective transformation matrix $H_2$ is to be calculated. Then, the projective transformation matrix $H_2$ is calculated. In other words, the coordinate values of the second intersection coordinates of the boundary lines in the normal image are transformed into the coordinate values of the local coordinate system of the first sub-region $S_1$, and then the projective transformation matrix $H_2$ is calculated.

When the intersection coordinates transformed into the coordinate values of the shaping region coordinate system and the second intersection coordinates of the boundary lines in the normal image, i.e., coordinates (xu, yu) before projective transformation, are transformed into the coordinate values of the local coordinate system, and assuming that the first sub-region $S_1$ where an image is projected from the projector 106a is a region where an X coordinate value is represented in the range of n to m and a Y coordinate value is represented in the range of p to q, the X coordinate value of the local coordinate system is obtained by subtracting "n" from "xu" and the Y coordinate value of the local coordinate system is obtained by subtracting "p" from "yu".

The image projection region R (see FIG. 16A) includes the first sub-region $S_1$ where an image is projected from the projector 106a and the second sub-region $S_2$ where an image is projected from the projector 106b. Therefore, the image projection region R is a region where the X coordinate value is represented in the range of 0 to 1366 and the Y coordinate value is represented in the range of 0 to 1536.

Figure 14A:
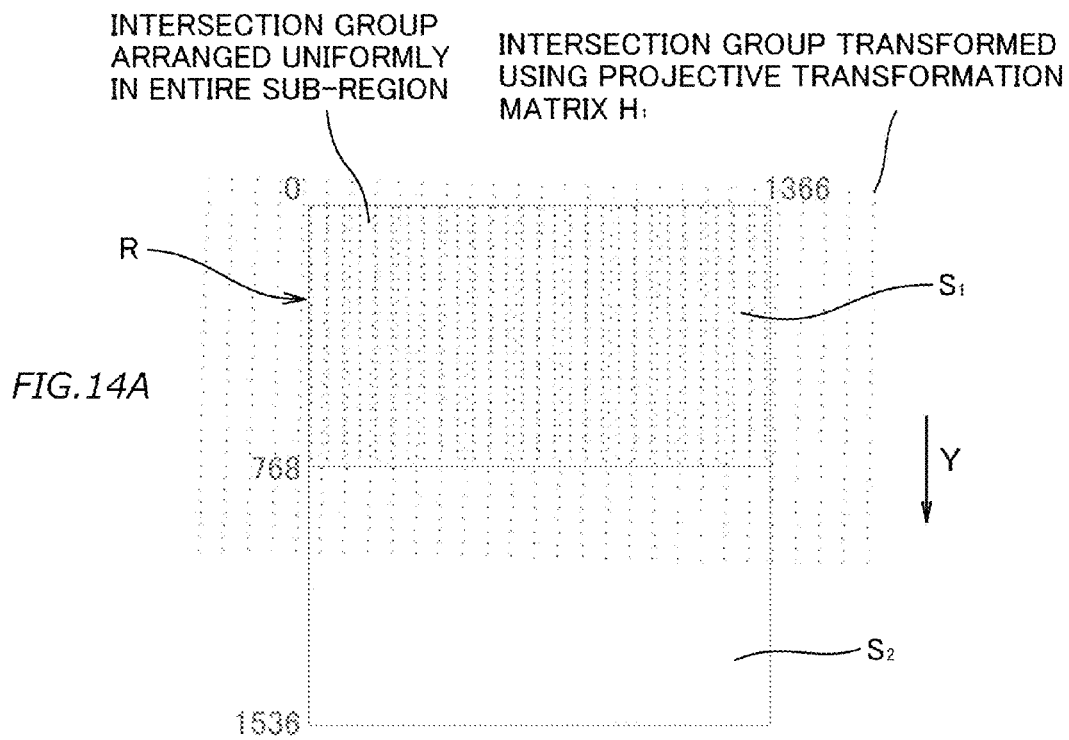
FIG. 14A is an explanatory diagram illustrating an intersection group obtained after transformation using the projective transformation matrix $H_1$ for a first sub-region where an image is projected from a first projector, and an intersection group arranged uniformly over the entire first sub-region.

As illustrated in FIG. 14A, when the projective transformation matrix $H_2$ for the projector 106a (first projector) is calculated, the X coordinate value is in the range of 0 to 1366 and the Y coordinate value is in the range of 0 to 768 in the first sub-region $S_1$ where an image is projected from the projector 106a. When the coordinates (xu, yu) before projective transformation (i.e., the coordinates of the shaping region coordinate system and the second intersection coordinates of the boundary lines in the normal image) are transformed into the coordinates of the local coordinate system, the local coordinates are (xu−0, yu−0), which means that the coordinate values are not changed.

Figure 14B:
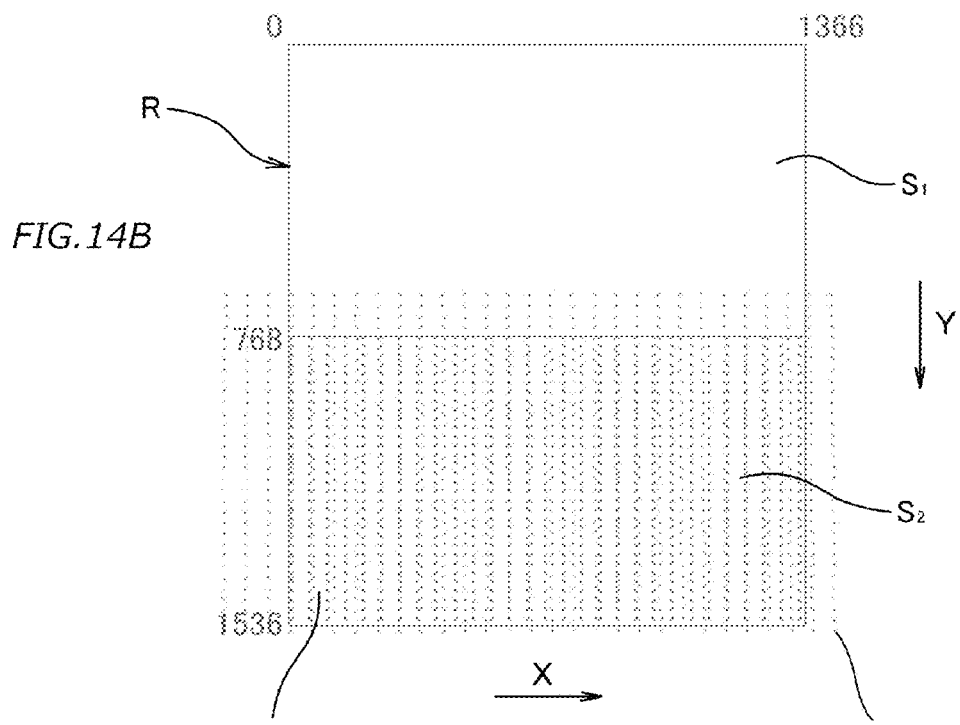
FIG. 14B is an explanatory diagram illustrating an intersection group obtained after transformation using the projective transformation matrix $H_1$ for a second sub-region where an image is projected from a second projector, and an intersection group arranged uniformly over the entire second sub-region.

As illustrated in FIG. 14B, when the projective transformation matrix $H_2$ for the projector 106b (second projector) is calculated, the X coordinate value is in the range of 0 to 1366 and the Y coordinate value is in the range of 768 to 1536 in the second sub-region $S_2$ where an image is projected from the projector 106b. When the coordinates (xu, yu) before projective transformation (i.e., the coordinates of the shaping region coordinate system and the second intersection coordinates of the boundary lines in the normal image) are transformed into the coordinates of the local coordinate system, the local coordinates are (xu−0, yu−768), which means that the X coordinate value is not changed while the Y coordinate value is obtained by subtracting 768 from "yu".

When the projective transformation matrix $H_2$ is calculated, not all of the intersection coordinates of the boundary lines, obtained by projective transformation using the projective transformation matrix $H_1$, are intended for the calculation of the projective transformation matrix $H_2$, but some of the intersection coordinates obtained by leaving out the intersection coordinates at regular intervals are intended for the calculation of the projective transformation matrix $H_2$. For example, the intersection coordinates obtained at intervals of 8 boundary lines are intended for the calculation of the projective transformation matrix $H_2$.

The calculated projective transformation matrix $H_2$ is outputted to the storage device 16 from the second transformation matrix calculation section 46, and stored in the storage device 16. The projective transformation matrix $H_2$ is stored as a projective transformation matrix specific to the projector selected in Step S414. When the projective transformation matrix $H_2$ has been stored in the storage device 16, the process returns to Step S412.

When a three-dimensional shaped object is actually shaped in the stereolithography apparatus 100, upon input of image data of images (divided images) projected from the projectors 106a and 106b in advance to the controller 114, the image data correction section 48 is configured to perform projective transformation of the inputted image data of the images by using the projective transformation matrix $H_2$.

Specifically, pre-transformation coordinate values (real number) are obtained from post-transformation integer coordinates, and pixel values at these coordinates are obtained by bilinear interpolation, thus performing the projective transformation of the image data by using the projective transformation matrix $H_2$. Note that in this image data projective transformation process performed using the projective transformation matrix $H_2$, a function such as warpPerspective( ) may be used for OpenCV 2.x, for example.

The image data that has been subjected to projective transformation and corrected for each of the projectors 106a and 106b by the image data correction section 48 is outputted to the storage device 16 and stored in the storage device 16. When an instruction for production of a three-dimensional shaped object is provided in the stereolithography apparatus 100, the image data stored in the storage device 16 is outputted to the projectors 106a and 106b. Images based on the corrected image data are projected from the projectors 106a and 106b, thus projecting the single image A (see FIG. 16B) in a proper state on the image projection region R (see FIG. 16A).

As described above, the image projection system 10 according to the present preferred embodiment calculates projective transformation matrices for correction of images projected from the projectors 106a and 106b, and corrects, using the calculated projective transformation matrices, the divided images P1 and P2 projected from the projectors 106a and 106b, respectively.

In the image projection system 10 according to the present preferred embodiment, the corrected divided images P1 and P2 are projected from the projectors 106a and 106b, respectively, in accordance with the installation positions and/or orientations of a plurality of the projectors, i.e., the projectors 106a and 106b.

The image projection system 10 and image projection method according to the present preferred embodiment allow the large image A to be projected in a proper state on the image projection region R without adjusting the installation position and/or orientation of each of the projectors 106a and 106b. Hence, installation of the image projection system 10 according to the present preferred embodiment in the stereolithography apparatus 100, for example, makes it unnecessary to provide a mechanism for adjusting the installation position and/or orientation of each projector unlike a conventional stereolithography apparatus, and therefore, the size of the entire apparatus is significantly reduced. Moreover, the number of components is reduced, thus cutting down fabrication cost.

Note that the foregoing preferred embodiment may be varied according to Variations 1 to 5 described below.

Variation 1

Although the foregoing preferred embodiment has been described based on the assumption that the image projection system 10 is preferably installed on the stereolithography apparatus 100, the image projection system 10 may be used for an apparatus other than the stereolithography apparatus 100, which requires a mechanism for projecting various images.

Variation 2

Although no specific mention is made in the foregoing preferred embodiment, the camera 108 may be detachably provided in the image projection system 10. More specifically, the camera 108 may be attached to a given position of the stereolithography apparatus 100 only when the projective transformation matrix $H_2$ is calculated at a given time, e.g., at the time of shipment of the stereolithography apparatus 100 or at the time of adjustment of the projector 106.

Variation 3

In the foregoing preferred embodiment, the image projection system 10 preferably includes the two projectors 106a and 106b, and the divided images P1 and P2 are projected from the projectors 106a and 106b, respectively, thus projecting the large image A on the image projection region R. However, the number of projectors to be included in the image projection system 10 is not limited to two. Alternatively, the image projection system 10 may include three or more projectors, and divided images may be projected from the three or more projectors, thus projecting the large image on the image projection region.

Variation 4

In the foregoing preferred embodiment, the projector 106a preferably projects the first divided image P1 on the first sub-region $S_1$ of the image projection region R via the mirror 104a and the projector 106b preferably projects the second divided image P2 on the second sub-region $S_2$ of the image projection region R via the mirror 104b. However, the first and second divided images P1 and P2 do not necessarily have to be projected on the first and second sub-regions $S_1$ and $S_2$ of the image projection region R via the mirrors 104a and 104b, respectively. The projector 106a may directly project the first divided image P1 on the first sub-region $S_1$ of the image projection region R without using the mirror 104a. The projector 106b may directly project the second divided image P2 on the second sub-region $S_2$ of the image projection region R without using the mirror 104b.

Variation 5

The foregoing preferred embodiment and Variations 1 to 4 described above may be combined with each other as appropriate.

The present invention may be applied to an apparatus such as a stereolithography apparatus which includes a mechanism configured to project images from projectors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An image projection system for projecting a single image on an image projection region by projecting images on different sub-regions within the image projection region from a plurality of image projection sections, the system comprising:

an image-taking section configured to take, via a lens, an image of a checkered sheet placed in the image projection region;

a correction section configured to correct lens-induced distortion of the taken checkered sheet image by using an internal parameter of the image-taking section;

a checker intersection coordinate detection section configured to detect, with sub-pixel precision, checker intersection coordinates in the corrected checkered sheet image;

a first transformation matrix calculation section configured to calculate a first projective transformation matrix for projective transformation of the detected checker intersection coordinates into checker intersection coordinates located at equal or substantially equal intervals in the image projection region;

a generation section configured to correct, when first positive images and first negative images of an 8-bit vertical Gray code pattern projected on a first sub-region of the image projection region from a given one of the image projection sections are taken by the image-taking section, lens-induced distortion of the taken first positive images and first negative images by using the internal parameter of the image-taking section, and generate a first spatial code image whose code value changes in a lateral direction based on the corrected first positive images and first negative images, and to correct, when second positive images and second negative images of an 8-bit horizontal Gray code pattern projected on the first sub-region from the given image projection section are taken by the image-taking section, lens-induced distortion of the taken second positive images and second negative images by using the internal parameter of the image-taking section, and generate a second spatial code image whose code value changes in a longitudinal direction based on the corrected second positive images and second negative images;

a boundary coordinate acquisition section configured to obtain, with sub-pixel precision, an intersection of brightness profiles in the corrected first positive images and first negative images, and obtain, with sub-pixel precision, an intersection of brightness profiles in the corrected second positive images and second negative images, thus acquiring the obtained intersections as boundary coordinates;

an intersection acquisition section configured to acquire, based on the acquired boundary coordinates, a first boundary line connecting the boundary coordinates of the same code value in the first spatial code image, acquire, based on the acquired boundary coordinates, a second boundary line connecting the boundary coordinates of the same code value in the second spatial code image, and combine the first and second spatial code images, thus acquiring first intersection coordinates of the first and second boundary lines;

a second transformation matrix calculation section configured to transform the acquired first intersection coordinates by using the first projective transformation matrix, and calculate a second projective transformation matrix for projective transformation of the transformed first intersection coordinates into second intersection coordinates distributed over the entire first sub-region; and an image data correction section configured to transform, using the second projective transformation matrix, image data to be outputted to the given image projection section, thus correcting the image data; wherein the second transformation matrix calculation section is configured to transform the first intersection coordinates transformed by using the first projective transformation matrix and the second intersection coordinates to be distributed over the entire first sub-region into coordinates of a local coordinate system specific to the given image projection section, and then calculate the second projective transformation matrix.

2. The image projection system according to claim 1, wherein the second intersection coordinates distributed over the entire first sub-region are intersection coordinates of the first and second boundary lines obtained when the first boundary line in the first spatial code image and the second boundary line in the second spatial code image are placed in a grid pattern in the first sub-region.

3. The image projection system according to claim 2, wherein when the first and second boundary lines are placed in a grid pattern in the first sub-region and a size of an input image of the given image projection section is "X" by "Y" pixels, a value of "j" obtained when a value of $\{Y+(j-1)\}/j$ (where "j" is a positive integer) is closest to a number of the first boundary lines is defined as an interval between the first boundary lines, and a value of "k" obtained when a value of $\{X+(k-1)\}/k$ (where "k" is a positive integer) is closest to a number of the second boundary lines is defined as an interval between the second boundary lines.

4. An image projection method for projecting a single image on an image projection region by projecting images on different sub-regions within the image projection region from a plurality of image projection sections, the method comprising:
   preparing an image-taking section that takes an image via a lens, and a plurality of image projection sections that project images on the different sub-regions within the image projection region;
   taking an image of a checkered sheet placed in the image projection region by the image-taking section;
   correcting lens-induced distortion of the taken checkered sheet image by using an internal parameter of the image-taking section;
   detecting, with sub-pixel precision, checker intersection coordinates in the corrected checkered sheet image;
   calculating a first projective transformation matrix for projective transformation of the detected checker intersection coordinates into checker intersection coordinates located at equal or substantially equal intervals in the image projection region;
   correcting, when first positive images and first negative images of an 8-bit vertical Gray code pattern projected on a first sub-region of the image projection region from a given one of the image projection sections are taken by the image-taking section, lens-induced distortion of the taken first positive images and first negative images by using the internal parameter of the image-taking section, and generating a first spatial code image whose code value changes in a lateral direction based on the corrected first positive images and first negative images;
   correcting, when second positive images and second negative images of an 8-bit horizontal Gray code pattern projected on the first sub-region from the given image projection section are taken by the image-taking section, lens-induced distortion of the taken second positive images and second negative images by using the internal parameter of the image-taking section, and generating a second spatial code image whose code value changes in a longitudinal direction based on the corrected second positive images and second negative images;
   obtaining, with sub-pixel precision, an intersection of brightness profiles in the corrected first positive images and first negative images, and obtaining, with sub-pixel precision, an intersection of brightness profiles in the corrected second positive images and second negative images, thus acquiring the obtained intersections as boundary coordinates;
   acquiring, based on the acquired boundary coordinates, a first boundary line connecting the boundary coordinates of the same code value in the first spatial code image, acquiring, based on the acquired boundary coordinates, a second boundary line connecting the boundary coordinates of the same code value in the second spatial code image, and combining the first and second spatial code images, thus acquiring first intersection coordinates of the first and second boundary lines;
   transforming the acquired first intersection coordinates by using the first projective transformation matrix, and calculating a second projective transformation matrix for projective transformation of the transformed first intersection coordinates into second intersection coordinates distributed over the entire first sub-region; and
   transforming, using the second projective transformation matrix, image data to be outputted to the given image projection section, thus correcting the image data;
   wherein
   the first intersection coordinates transformed by using the first projective transformation matrix and the second intersection coordinates to be distributed over the entire first sub-region are transformed into coordinates of a local coordinate system specific to the given image projection section, and then the second projective transformation matrix is calculated.

5. The image projection method according to claim 4, wherein the second intersection coordinates distributed over the entire first sub-region are intersection coordinates of the first and second boundary lines obtained when the first boundary line in the first spatial code image and the second boundary line in the second spatial code image are placed in a grid pattern in the first sub-region.

6. The image projection method according to claim 5, wherein when the first and second boundary lines are placed in a grid pattern in the first sub-region and a size of an input image of the given image projection section is "X" by "Y" pixels, a value of "j" obtained when a value of $\{Y+(j-1)\}/j$ (where "j" is a positive integer) is closest to a number of the first boundary lines is defined as an interval between the first boundary lines, and a value of "k" obtained when a value of $\{X+(k-1)\}/k$ (where "k" is a positive integer) is closest to a number of the second boundary lines is defined as an interval between the second boundary lines.

* * * * *